(12) United States Patent
Graham et al.

(10) Patent No.: US 10,980,183 B2
(45) Date of Patent: Apr. 20, 2021

(54) SELF-PROPELLED VEHICLES WITH EXTENDABLE DEVICES

(71) Applicant: Vermeer Manufacturing Company, Pella, IA (US)

(72) Inventors: Curt T. Graham, Lynnville, IA (US); Kent L. Thompson, Otley, IA (US); Nathan D. Dockter, Pella, IA (US); Kent M. Recker, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 140 days.

(21) Appl. No.: 16/058,386

(22) Filed: Aug. 8, 2018

(65) Prior Publication Data

US 2019/0045716 A1 Feb. 14, 2019

Related U.S. Application Data

(60) Provisional application No. 62/544,144, filed on Aug. 11, 2017, provisional application No. 62/547,419, filed on Aug. 18, 2017.

(51) Int. Cl.
*A01F 15/08* (2006.01)
*A01B 63/10* (2006.01)
(Continued)

(52) U.S. Cl.
CPC ............ *A01F 15/08* (2013.01); *A01B 51/026* (2013.01); *A01B 59/006* (2013.01); *A01B 59/06* (2013.01);
(Continued)

(58) Field of Classification Search
CPC .. A01F 15/08; A01F 15/07; A01F 2015/0891; A01F 2015/0735; A01F 2015/0808; A01D 46/084; A01B 51/00; A01B 51/02; A01B 51/026; A01B 51/023; A01B 59/006; A01B 59/06; A01B 59/061; A01B 59/062; A01B 59/069; A01B 63/10
See application file for complete search history.

(56) References Cited

U.S. PATENT DOCUMENTS 3,324,637 A 6/1967 Ashton et al.
3,425,194 A 2/1969 Stott et al.
(Continued)

FOREIGN PATENT DOCUMENTS

CH 689187 A5 11/1998
EP 2443916 A1 4/2012
(Continued)

OTHER PUBLICATIONS

Farms & Farm Machinery, "Review: The New Goweil G-1 F125 Speeds Up Baling". 10 pgs., retrieved from https://www.tradefarmmachinery.com.au/reviews/1506/the-new-goweil-g-1-f125-speeds-up-baling, Jul. 24, 2015.

*Primary Examiner* — Adam J Behrens
(74) *Attorney, Agent, or Firm* — Armstrong Teasdale LLP

(57) ABSTRACT

Self-propelled vehicles for supporting and operating a device are disclosed. Example devices include agricultural devices. The vehicle includes mounting arms that allow the device to be extended forward or rearward of the vehicle. In some embodiments, the device is releasably coupleable to the vehicle. In some embodiments, the vehicle includes rear drive wheels and front caster wheels.

10 Claims, 19 Drawing Sheets

(51) Int. Cl.
*A01B 59/06* (2006.01)
*A01B 51/02* (2006.01)
*A01B 59/00* (2006.01)
*A01F 15/07* (2006.01)

(52) U.S. Cl.
CPC .............. *A01B 63/10* (2013.01); *A01F 15/07* (2013.01); *A01B 59/069* (2013.01)

(56) References Cited

U.S. PATENT DOCUMENTS

| | | | | | |
|---|---|---|---|---|---|
| 3,645,074 | A | * | 2/1972 | Rettig | A01D 41/04 56/14.6 |
| 3,646,735 | A | | 3/1972 | Fritz | |
| 3,720,047 | A | * | 3/1973 | van der Lely | B62D 49/02 56/15.6 |
| 4,078,626 | A | * | 3/1978 | Weichel | A01D 67/00 111/131 |
| 4,541,652 | A | * | 9/1985 | Deux | B60G 17/04 280/124.127 |
| 4,791,996 | A | * | 12/1988 | van der Lely | A01B 51/026 172/116 |
| 4,838,015 | A | * | 6/1989 | Mouret | A01B 71/066 172/47 |
| 5,029,436 | A | * | 7/1991 | Fredriksen | A01D 41/04 180/89.13 |
| 5,642,677 | A | * | 7/1997 | Meyer | A01B 39/166 111/118 |
| 5,755,382 | A | * | 5/1998 | Skotinkov | A01B 51/026 180/411 |
| 6,421,996 | B1 | * | 7/2002 | Deutsch | A01D 46/084 100/88 |
| 6,669,433 | B1 | | 12/2003 | De Kock | |
| 6,941,740 | B2 | * | 9/2005 | Fox | A01D 46/084 100/88 |
| 7,467,507 | B2 | | 12/2008 | Viaud | |
| 7,549,279 | B2 | * | 6/2009 | Merant | A01B 59/063 56/15.6 |
| 7,563,065 | B1 | | 7/2009 | Bennet | |
| 8,011,295 | B1 | * | 9/2011 | Smith | A01F 15/148 100/4 |
| 8,070,415 | B2 | | 12/2011 | Tuel | |
| 9,844,179 | B1 | * | 12/2017 | Goering | A01D 46/16 |
| 10,575,466 | B2 | * | 3/2020 | Reed | A01D 67/00 |
| 10,687,472 | B2 | * | 6/2020 | Derscheid | A01F 15/0833 |
| 2002/0084085 | A1 | * | 7/2002 | Pellenc | B62D 49/0607 172/762 |
| 2006/0278103 | A1 | * | 12/2006 | Derscheid | A01F 15/0883 100/88 |
| 2009/0217827 | A1 | * | 9/2009 | Duenwald | A01F 15/0715 100/88 |
| 2014/0174303 | A1 | * | 6/2014 | Posselius | A01F 15/0833 100/76 |
| 2016/0050851 | A1 | * | 2/2016 | Kraus | A01F 15/0883 56/341 |
| 2017/0245417 | A1 | * | 8/2017 | Frascella | B60D 1/44 |

FOREIGN PATENT DOCUMENTS

| | | |
|---|---|---|
| ES | 2557058 A1 | 1/2016 |
| FR | 1179515 A | 5/1959 |

* cited by examiner

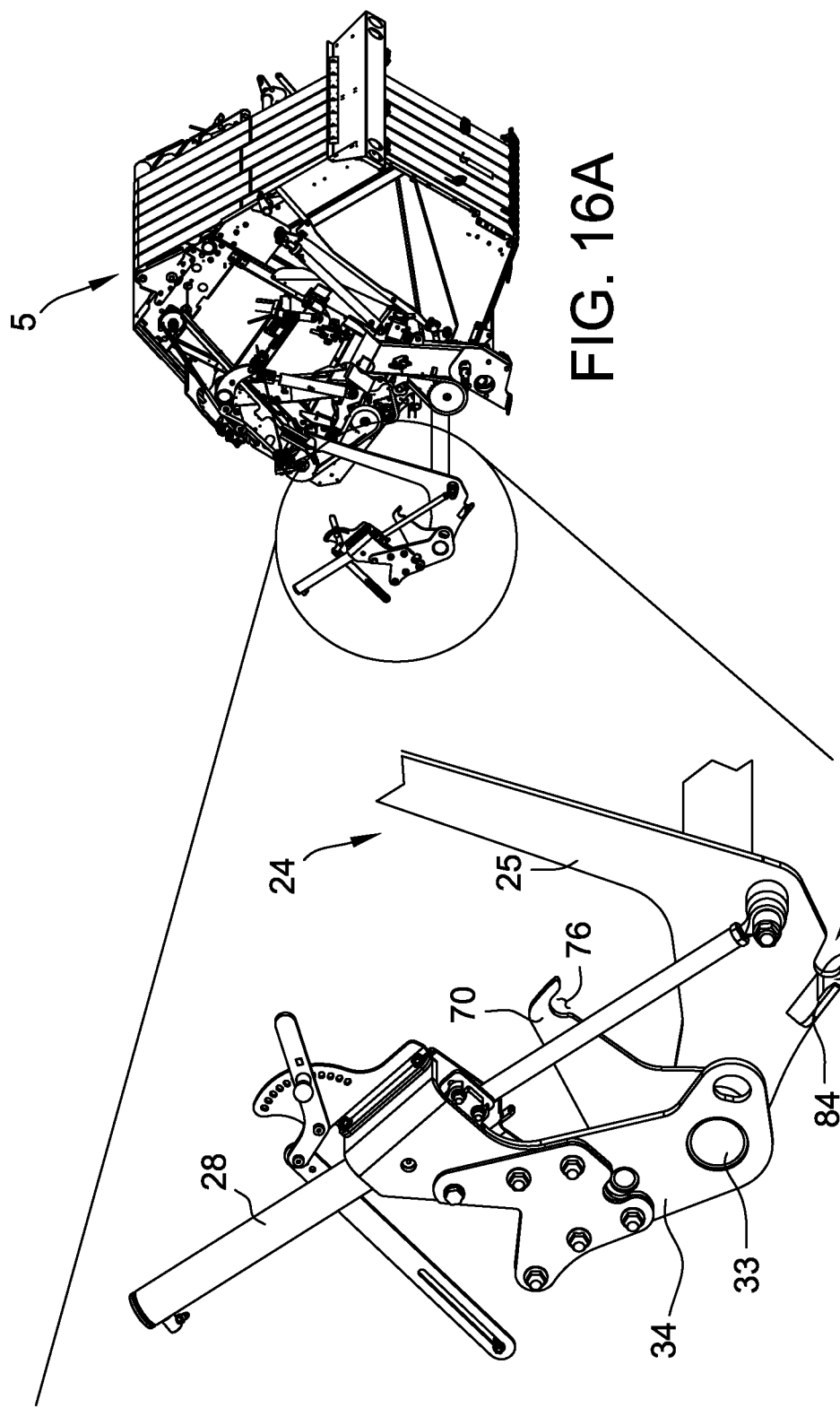

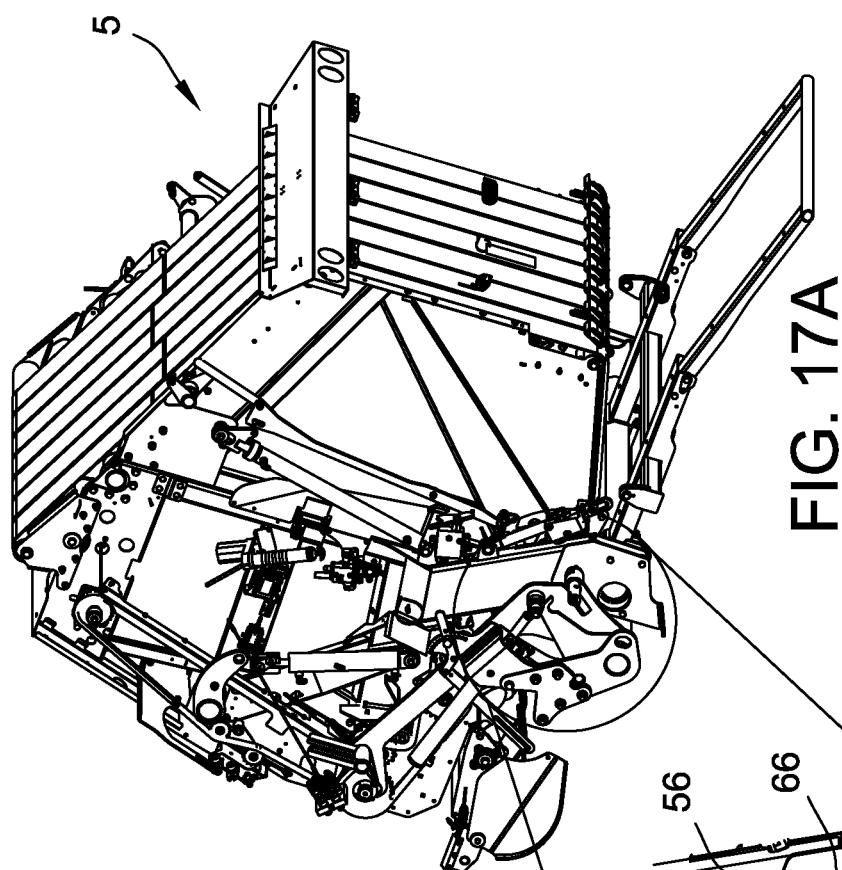
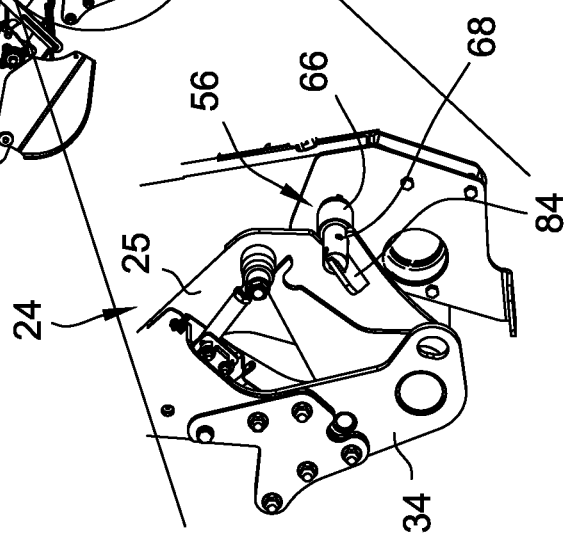
FIG. 17A
FIG. 17B

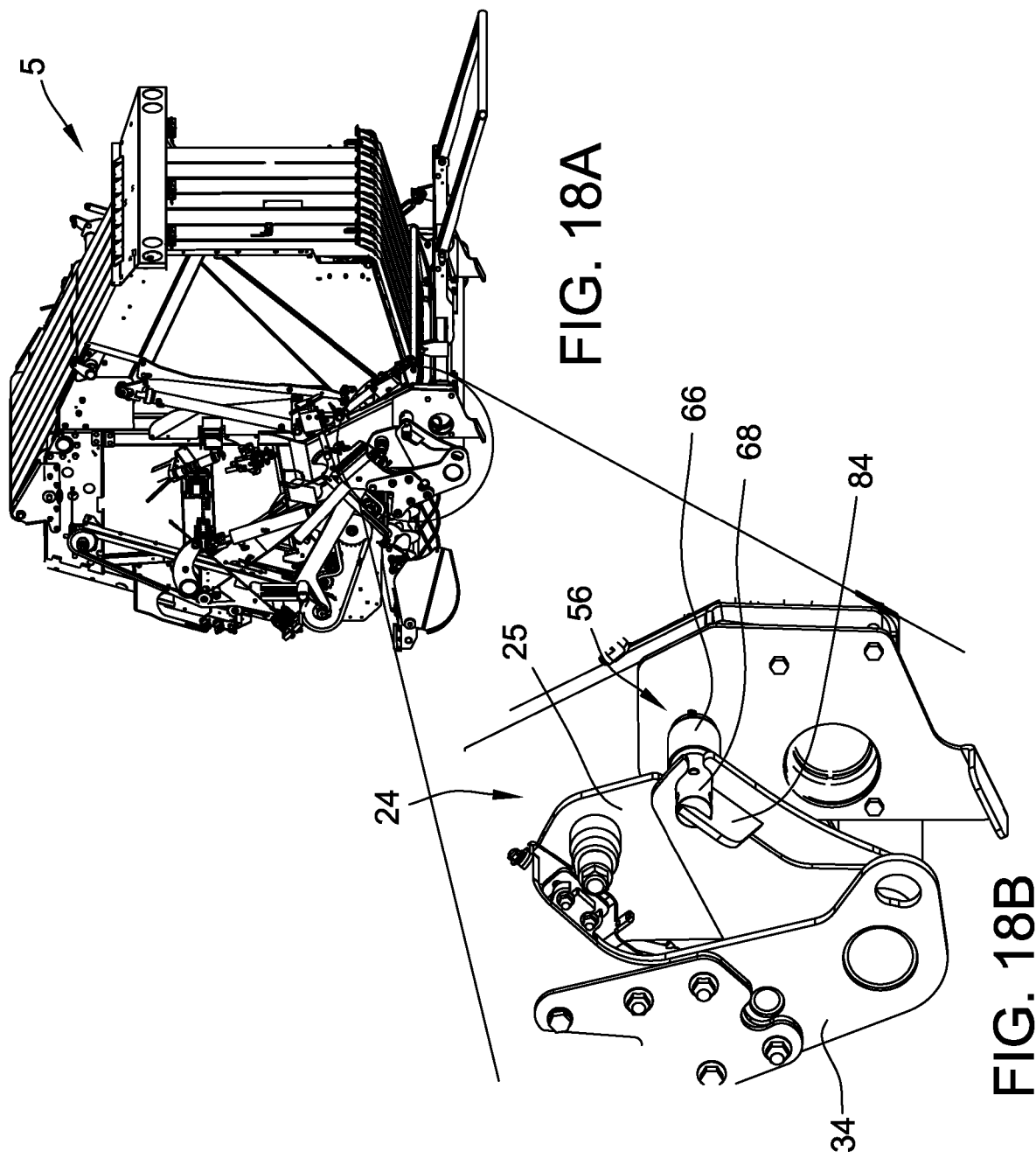

SELF-PROPELLED VEHICLES WITH EXTENDABLE DEVICES

CROSS-REFERENCE TO RELATED APPLICATIONS

This application claims the benefit of U.S. Provisional Patent Application No. 62/544,144, filed Aug. 11, 2017 and U.S. Provisional Patent Application No. 62/547,419, filed Aug. 18, 2017, both of which are incorporated herein by reference in their entirety.

FIELD OF THE DISCLOSURE

The field of the disclosure relates to self-propelled vehicles for supporting and operating a device in which the device may be extended rearward or frontward from the vehicle. The device may be releasably coupleable to the vehicle.

BACKGROUND

Agricultural operations involve a number of implements, some of which may be towed implements and others which may include dedicated propulsion systems (e.g., sprayers). In particular, forage gathering involves a number of towed implements such as mowers and mower conditioners, rakes, hay mergers and balers.

Towed implements are typically towed behind a tractor which may limit the field of vision of the operator, reduce maneuverability, and require higher skilled operators. The tractor and implement assembly are relatively long which makes turning such towed assemblies difficult. The tractor and implement are pivotally attached and the implement limits the turning radius of the tractor.

A need exists for self-propelled vehicles that can extend a device such as an agricultural device frontward or rearward from the vehicle to allow the device to be accessible for maintenance and/or that are modular and allow the device to be released from the vehicle.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a self-propelled vehicle for supporting and operating a device. The vehicle has a longitudinal axis and includes a chassis, a front wheel connected to the chassis, and a rear wheel connected to the chassis. The vehicle includes a vehicle-device interface for powering and/or controlling the device. The interface is releasably coupleable to the device. The vehicle includes a device mount for releasably attaching a device. The device mount includes a mounting arm having a mounting surface for connecting to the device. The mounting arm is pivotal to move the device from a working position to an extended position. The extended position is disposed behind the working position relative to the longitudinal axis.

Another aspect of the present disclosure is directed to a self-propelled vehicle for supporting and operating a device. The vehicle has a longitudinal axis and includes a base vehicle having a chassis, a front wheel connected to the chassis, and first and second rear wheels connected to the chassis. The base vehicle includes a device mount for releasably attaching a device. The device mount includes a mounting arm having a mounting surface for connecting to the device. The mounting arm is pivotal to move the device from a working position to an extended position. The extended position is disposed behind the working position relative to the longitudinal axis. The vehicle includes a device releasably coupleable to the device mount of the base vehicle. The device is between the first and second drive wheels when in the working position.

A further aspect of the present disclosure is directed to a modular baler capable of being releasably attached to a device mount of a base vehicle. The modular baler includes a baling chamber for forming a bale. The modular baler includes first and second forward mounting members for connecting the baler to a device mount of the base vehicle. The modular baler includes first and second rear mounting members for connecting the baler to the device mount of the base vehicle.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

FIG. 16A is a perspective view of another embodiment of the device mount and a baling device with the device mount dismounted from a rear mounting member of the device;

FIG. 16B is a detailed perspective view of FIG. 16A;

FIG. 17A is a perspective view of the device mount and baling device of FIG. 16 in an intermediate position;

FIG. 17B is a detailed perspective view of FIG. 17A;

FIG. 18A is a perspective view of the device mount and baling device of FIG. 16 in a working position;

FIG. 18B is a detailed perspective view of FIG. 18A; and

Corresponding reference characters indicate corresponding parts throughout the drawings.

DETAILED DESCRIPTION

Figure 1:
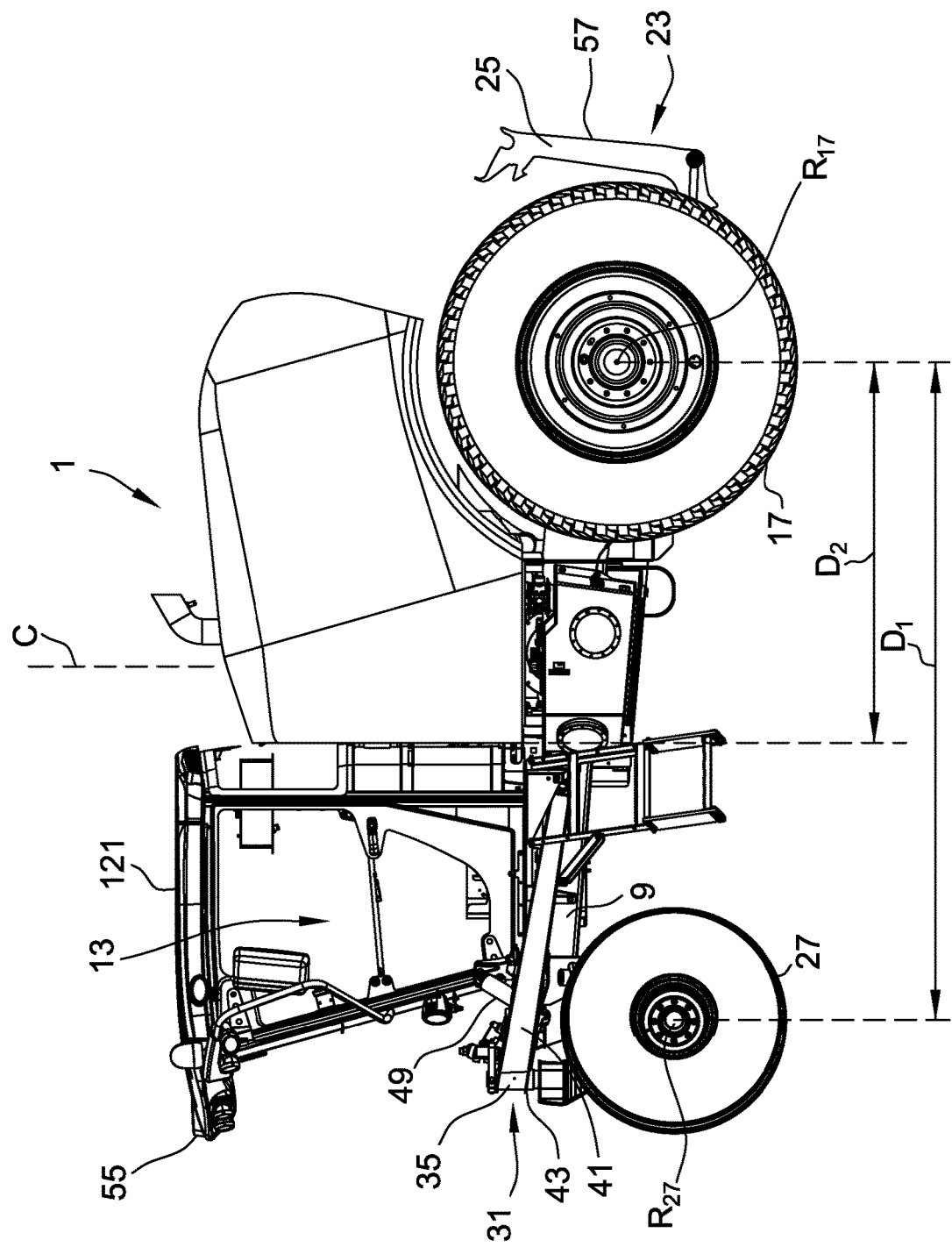
FIG. 1 is a side view of a modular self-propelled vehicle.

A self-propelled vehicle (which may be referred to herein as the "base vehicle") for supporting and operating various agricultural devices is generally referred to as "1" in FIG. 1. The vehicle 1 is a base vehicle to which various devices such as agricultural devices may be attached. While the description and figures below may show and/or reference a baling device, it should be noted that a baling device is shown as an exemplary device and the descriptions are applicable to the base vehicle itself and/or a base vehicle that includes one or more different devices attached thereto. While the device may, in some embodiments, be described as an agricultural device, in other embodiments the coupleable device may be suitable for use in other fields.

With reference to FIG. 1, the base vehicle 1 includes first and second rear drive wheels 17 that are driven by first and second motors disposed in the drive wheels. The rear drive wheels 17 each have a rotational axis $R_{17}$ about which the drive wheels 17 rotate. In the illustrated embodiment, the wheels 17 have a common rotational axis $R_{17}$. In other embodiments the wheels 17 are offset from each other and have different axes of rotation. The drive wheels 17 are attached to the chassis 9.

The rear wheels 17 are fixed to the chassis 9 such that the wheels 17 maintain parallel alignment with a longitudinal axis A (FIG. 4) of the vehicle 1 (i.e., do not pivot with respect to the chassis 9). In some embodiments, the rear drive wheels 17 are not suspended from the chassis 9.

The longitudinal axis A (FIG. 4) of the vehicle 1 extends from a front 55 to a rear 57 of the vehicle 1. As referenced herein, the "front" of the vehicle 1 refers to a leading portion or end of the vehicle 1 relative to the longitudinal axis during its conventional operation. The "rear" refers to the trailing portion or end relative to the longitudinal axis A during its conventional operation. Similarly, the terms "front wheels" and "rear wheels" refer to the position of the wheels relative to the direction of travel of the vehicle 1 during its conventional operation. The vehicle 1 also includes a lateral axis B (FIG. 4) that extends from a first side 58 to a second side 59 of the vehicle 1 and that is transverse to the longitudinal axis A. The vehicle 1 also includes a vertical axis C (FIG. 1).

Figure 2:
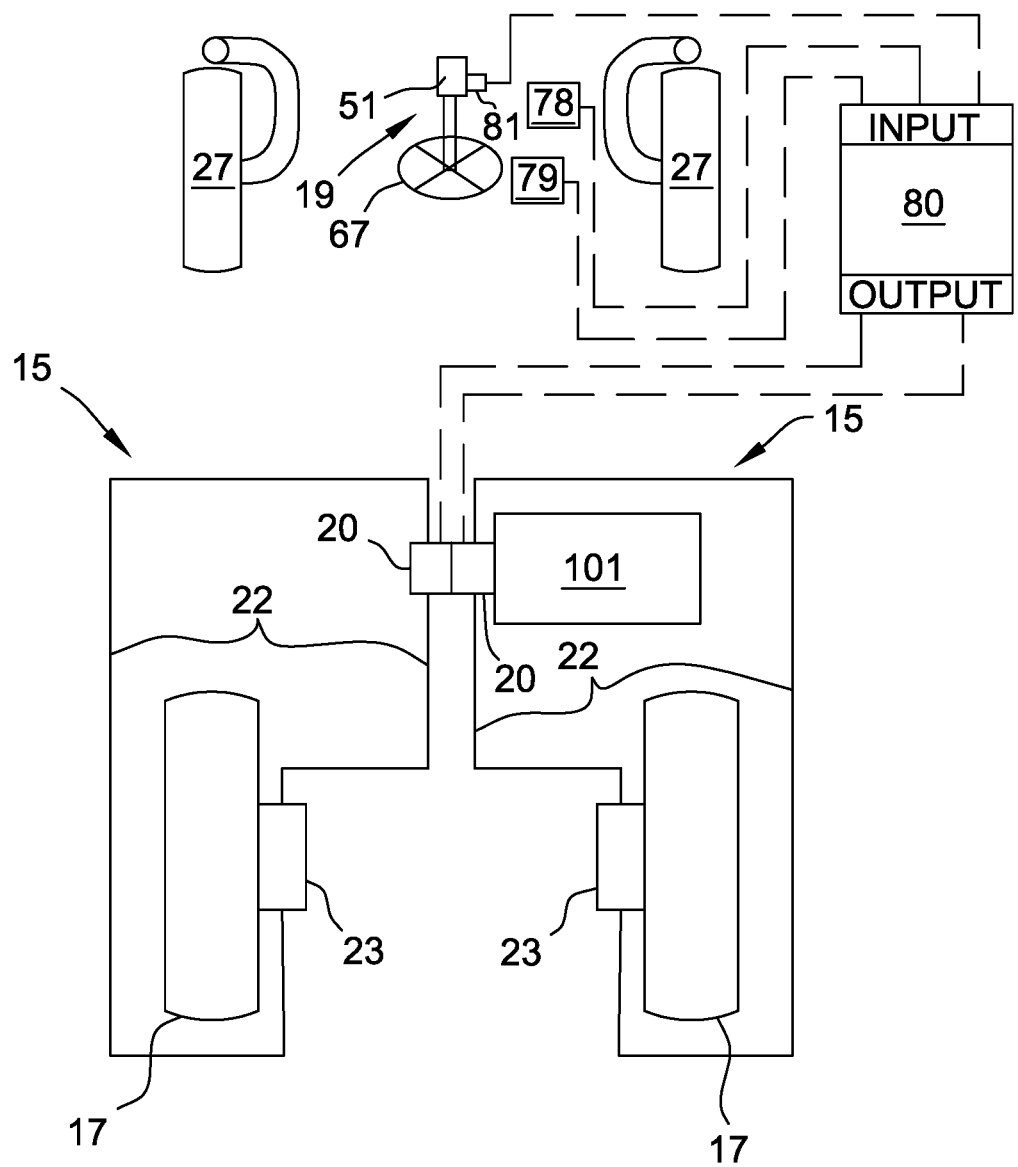
FIG. 2 is a schematic view of the self-propelled vehicle showing the drive systems.

With reference to FIG. 2, the first and second drive wheels 17 are each driven and controlled by separate drive systems 15. The caster wheels 27 are freely pivotable (i.e., are not steered or otherwise controlled). As a result, the first and second caster wheels 27 self-align with the direction of travel of the vehicle while it is steered by the difference in the speed of rotation of the drive wheels 17.

Each drive system 15 has a drive motor 23 for rotating the drive wheel 17 forward or backward. The drive motors 23 may be hydraulic motors that are driven by a pump 20 that is powered by the engine 101. Each drive wheel 17 may be controlled by a separate circuit (i.e., separate hydraulic pumps 20 with fluid lines 22 connected to the drive wheel motors 23). The first and second pumps 20 may be hydrostatic, variable displacement pumps. In some embodiments, fixed displacement or variable displacement motor(s) may be used.

The wheels 17 are powered and rotated independently by the drive systems 15. Accordingly, the wheels 17 can be rotated at different speeds by driving the motors at different speeds. For example, the motors 23 may receive different amounts of fluid from the respective pumps 20 to differentiate the speed of the wheels 17. Separate fluid lines 22 extend between each pump 20 and drive motor 23 to independently rotate the wheels 17. The direction of fluid flow may be forward or reverse to independently rotate the wheels forward or reverse to propel the vehicle forward, reverse, or through an arc (e.g., as during steering). The vehicle 1 may also be steered in more aggressive manners in which one wheel remains stationary while the other wheel is rotated, or a zero-turn-radius mode where the drive wheels are rotated in opposite directions.

In some operating conditions (e.g., travel or "highway" modes) the first and second drive wheels 17 are powered equally (e.g., with a differential system linking the drive systems) and a caster wheel steering system (not shown) may be used to control the swivel position of the caster wheels 27 to steer the vehicle. As used herein, the "swivel position" of the caster wheels generally refers to the angular position of the caster wheels relative to the longitudinal axis A of the vehicle. Suitable steering systems may include adjustable length tie-rods (e.g., three position cylinders) connected to a steering mechanism such as a steering wheel. The tie-rods may be fixed in length in a caster-wheel steering mode and variable in length in non-caster wheel steering modes (e.g., by use of three-position cylinders which float in non-caster wheel steering modes and are locked in caster wheel steering modes). Any steering system which enables caster wheel steering in a caster wheel steering mode may be used unless stated otherwise.

The vehicle 1 includes a control system to control the drive wheels 17 and/or front caster wheels 27 based on input(s) from an operator. The control system includes a control unit 80, speed and direction control device 78, a mode selector 79 and steering mechanism which is shown as a steering wheel 67. The speed and direction control device 78, mode selector 79 and steering wheel 67 may be controlled from the operator station 13.

The control unit 80 includes a processor and a memory. The processor processes the signals received from various sensors, selectors and control devices of the system. The memory stores instructions that are executed by the processor.

The mode selector 79 allows the operator to select a desired mode of operation (i.e., drive wheel steering mode or caster wheel steering mode). The control unit 80 receives the signal from the mode selector 79 and controls the mode of the steering system in response to the signal. The mode selector 79 may be, for example, part of a touch screen, a soft key, toggle switch, selection button or any other suitable interface for selecting the steering mode.

The speed and direction control device 78 is typically hand-operated and may be a sliding lever that that causes an increase in forward speed as the lever is slid forward of a neutral position and an increase in reverse direction as the lever is slid rearward of the neutral position. The speed and direction control device 78 produces a signal in response to its position and the signal is transmitted to the control unit 80. The control unit 80 produces an output signal transmitted to the hydraulic pumps 20 that drive the rear wheels 17. The speed may also be controlled by a throttle that controls the engine speed. The vehicle 1 may be stopped by moving the speed and direction control device 78 to a zero-speed setting and/or by operating foot brake levers.

In the illustrated embodiment, steering may be performed by a steering mechanism shown as a steering wheel 67 which regulates the steering system. For example, in the drive wheel steering mode, a sensor 81 measures the direction and angle of the steering wheel 67 and sends signals to the control unit 80. The control unit 80 produces a signal that is transmitted to the hydraulic pumps 20 to independently regulate the rotational speeds of the first and second drive wheels 17 (i.e., the rotation speed and direction of rotation of each drive wheel 17).

In other embodiments, speed and/or steering may be controlled by different operator controls such as wheel levers, digital inputs, joysticks, dual sticks, and headsets.

In some embodiments, the self-propelled vehicle 1 is configured to operate autonomously. The vehicle 1 may include sensors (e.g., cameras, GPS sensors and the like) that sense the position of the windrow and/or that may sense the position of the vehicle in the field. The vehicle 1 may also include a controller that sends signals to the first and second rear wheel pumps or to various actuators to independently control the first and second rear drive wheels. In some embodiments, the field in which the vehicle is propelled is mapped and the field map is used to autonomously control the operation of the vehicle in the field. In such embodiments, the vehicle may include a riding station to carry an operator or the operator station may be eliminated.

The self-propelled vehicle 1 includes first and second front caster wheels 27 that are pivotally connected to the chassis 9 about a vertical pivot axis (which may be offset from the vertical axis, i.e., may have a caster angle). The term "caster wheel" includes a wheel mounted to a frame or chassis at a generally vertically oriented caster pivot so that the caster wheel is able to swivel about the caster pivot. In other embodiments, the front wheels 27 are not caster wheels. In some embodiments, the front wheels are drive wheels, in which case the rear wheels may not be drive wheels.

The first and second caster wheels 27 swing below a portion of the chassis 9. The front caster wheels 27 may be spaced to allow a windrow of crop or forage material to pass between the front caster wheels 27 and engage a pickup device (not shown). In some embodiments, the front caster wheels 27 are separated by at least five feet or at least about seven feet. Similarly, the rear wheels 17 may be spaced to allow a device 5 (e.g., baler) to be positioned between the rear wheels. In some embodiments, the vehicle 1 includes a single front caster wheel (e.g., one front caster wheel centered relative to the lateral axis of the vehicle).

The front caster wheels 27 are independently suspended from the chassis to absorb forces transmitted during travel over uneven terrain. The front caster wheels 27 pivot with respect to the chassis 9 about their pivot axis to allow the wheels 27 to be aligned with the direction of travel of the vehicle 1 and as a response to the differential speed of the first and second drive wheels 17. In some embodiments, the front caster wheels 27 are freely pivotal and turn only as a response to the differential speed of the rear drive wheels 17. In other embodiments, the front caster wheels 27 are steered (e.g., controlled to coordinate turning with rear drive wheels or steered independently of the rear drive wheels 17).

Each front caster wheel 27 has a rotational axis $R_{27}$ (FIG. 1) about which the front caster wheels 27 rotate. In the illustrated embodiment, the wheels 27 have a common rotational axis $R_{27}$.

The front caster wheels 27 may be part of first and second swivel caster assemblies 31 (FIG. 1). Generally the first and second swivel caster assemblies 31 and subframes 41 described below are symmetric and description herein of an assembly or subframe also applies to the second assembly or subframe (e.g., description of a hub of the assembly indicates that the first assembly has a first hub and that the second assembly has a second hub). Each assembly 31 includes a hub 35 and a caster shaft that rotates within the hub 35. The swivel caster assemblies 31 may include bushings or bearings within the hub 35 that allow for rotation of the shaft within the hub 35. Each caster shaft is connected to a leg assembly 42 (FIG. 4) that connects to the front caster wheel axle. In the illustrated embodiment, the leg assembly 42 includes a single leg that attaches to an inner side of the wheel axle. In other embodiments, the leg assembly includes two legs that connect to the axle of the front caster wheel on each side of the wheel (as with a caster fork).

The hub 35 and shaft form a swivel joint 43. The first and second front caster wheels 27 of the caster assemblies 31 are each connected to a subframe 41 by the swivel joint 43. The subframes 41 are suspended from the chassis 9 by a mechanism having a suspension element 49, shown as a hydraulic cylinder in the illustrated embodiment. The cylinder may be connected to an accumulator in the suspension system. Each subframe 41 is also pivotally attached to the chassis 9 at inner and outer pivot points. In this arrangement, the chassis 9 is supported by the subframes 41 and the chassis 9 and components carried by the chassis (e.g., operator station) may move up and down relative to the subframes 41 as the vehicle 1 travels over uneven terrain.

As shown in FIG. 1, the first and second front caster wheels 27 (i.e., the axes of rotation $R_{27}$ of each wheel) are offset from the swivel joint 43 relative to the longitudinal axis A (FIG. 4) of the vehicle. The offset allows the first and second front caster wheels 27 to self-align with the direction of travel of the vehicle 1 as the vehicle is steered by differences between the speeds of the rear wheels 17. The offset of the caster wheels (i.e., distance between the axis of rotation $R_{27}$ of the wheel and the swivel joint 43 relative to the longitudinal axis A) may be at least 4 inches, at least about 8 inches or from about 8 to about 20 inches. These ranges are exemplary and other ranges may be used unless stated otherwise.

In other embodiments and/or in different modes of operation the front caster wheels 27 are steered (e.g., travel/highway modes). In such embodiments, the offset may be eliminated.

The caster assemblies 31 allow the first and second front caster wheels 27 to self-align with the direction of travel of the vehicle while it is steered by the difference in the speed of rotation of the rear wheels 17. In the illustrated embodiment, the first and second front caster wheels 27 pivot independently from each other.

As shown in FIG. 1, the rear wheels 17 have a diameter larger than the front caster wheels 27. In some embodiments, the ratio of the diameter of the rear wheels 17 to the diameter of the front caster wheels is at least about 1.25:1 or at least about 1.5:1 or even at least about 3:1.

Figure 3:
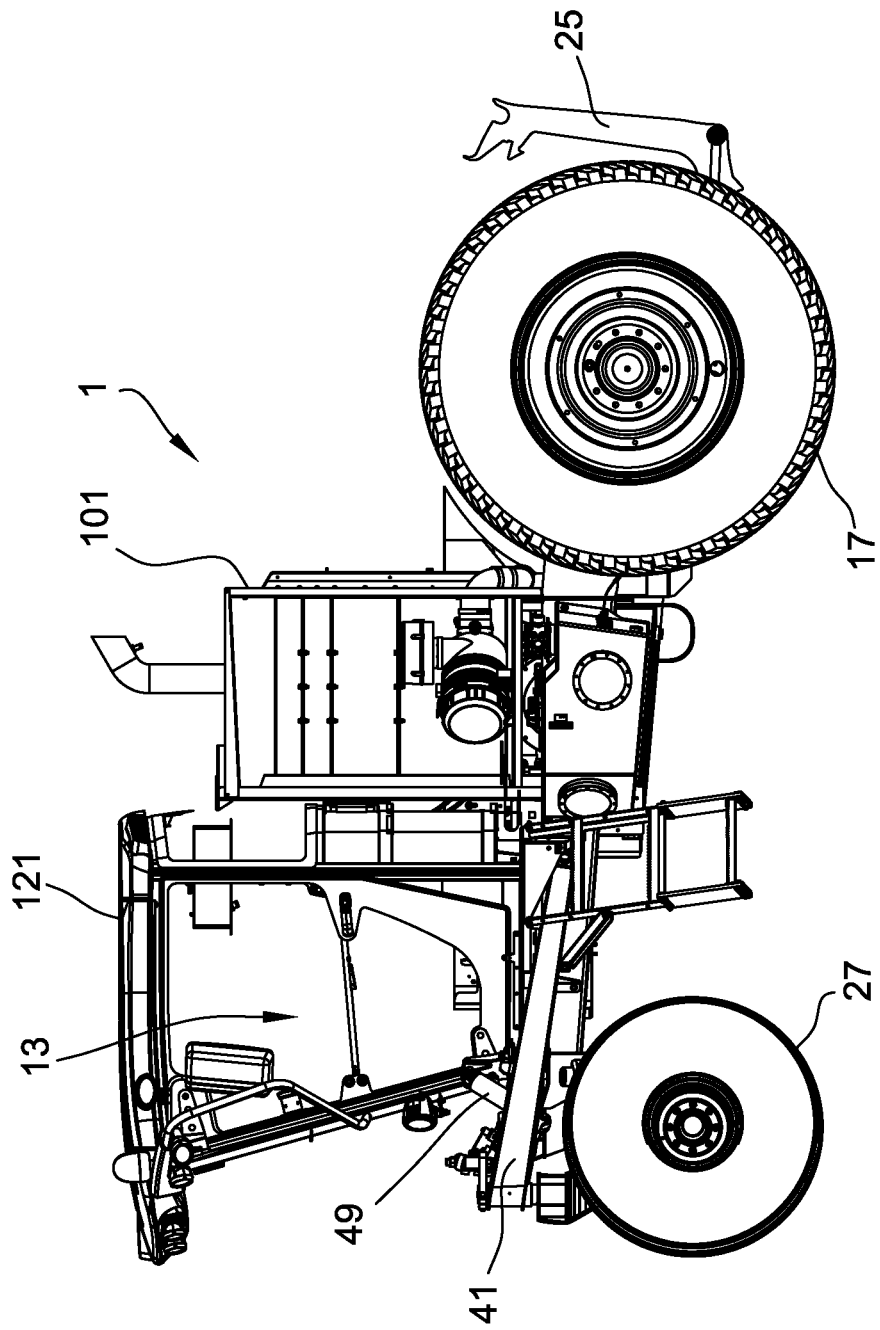
FIG. 3 is a side view of the vehicle with shields removed.

Referring now to FIG. 3, the vehicle 1 includes an engine 101 (e.g., gas or diesel powered engine) that drives one or more hydraulic pumps which in turn power the various hydraulic motors and cylinders (e.g., first and second drive wheel motors, baling chamber motor, pick-up device motor, pick-up device lift cylinder, tailgate cylinder and/or ramp cylinder). The engine 101 also provides power for the electrical systems of the vehicle 1. The engine 101 is between the rotational axes $R_{17}$ of the rear drive wheels 17 and the rotational axes $R_{27}$ of the front caster wheels 27.

In some embodiments, the engine 101 may be connected to a mechanical drive element. A coupling system may provide direct mechanical drive to a component carried by the chassis. The illustrated embodiments may show or describe hydraulic and electrical couplings. Any power and/or coupling system suitable for powering a device may be used unless stated otherwise.

The operator station is disposed forward to the engine 101. As referenced herein, the "operator station" refers to the seat and controls for steering and controlling the speed of the vehicle 1 and/or for controlling the device. The operator station is enclosed in a cab 121. As shown in FIG. 1, the cab 121 is forward of the rotational axis $R_{17}$ of the rear drive wheels 17 and is also forward to the engine 101. The cab 121 is partially aligned with the rotational axis $R_{27}$ of the front caster wheels 27.

A distance $D_1$ (FIG. 1) separates the rotational axis $R_{17}$ of the rear drive wheels and the rotation axis $R_{27}$ of the front caster wheels 27. In some embodiments, the distance $D_2$ between the rear wheel rotational axis $R_{17}$ and the cab 121 is at least about $0.4*D_1$ (i.e., the cab is at least about 40% forward of the distance between the axis $R_{17}$, $R_{27}$), or at least about $0.5*D_1$ or even at least about $0.6*D_1$.

The self-propelled vehicle 1 (FIG. 1) includes one or more device mounts for extending a device forward or rearward from the base vehicle 1. In some embodiments, the device mount allows the device to be releasably attached to the base vehicle 1. The device may be an agricultural device such as a mower and mower conditioner, merger, baler, rake, tedder, bale processor, bale mover, sprayer, broadcast spreader, fruit or nut harvester, feed mixers (e.g., vertical mixers), manure spreader, and the like. Other devices include salt and aggregate spreaders, shipping containers (e.g., trash, commodities, household items or other goods), construction devices, trenchers, concrete cutters and the like.

The term "modular" as used herein should not be viewed to imply that the vehicle 1 is compatible with different types of devices. For example, the modular self-propelled vehicle 1 may include one or more device mounts to allow the device to be pivoted off of the vehicle chassis 9 (FIG. 4) to provide access to the device for maintenance or to replace the device with a new device (e.g., upon wear or failure of an agricultural device) or to install a larger-sized device (e.g., larger baler) or a different model of device.

Figure 6:
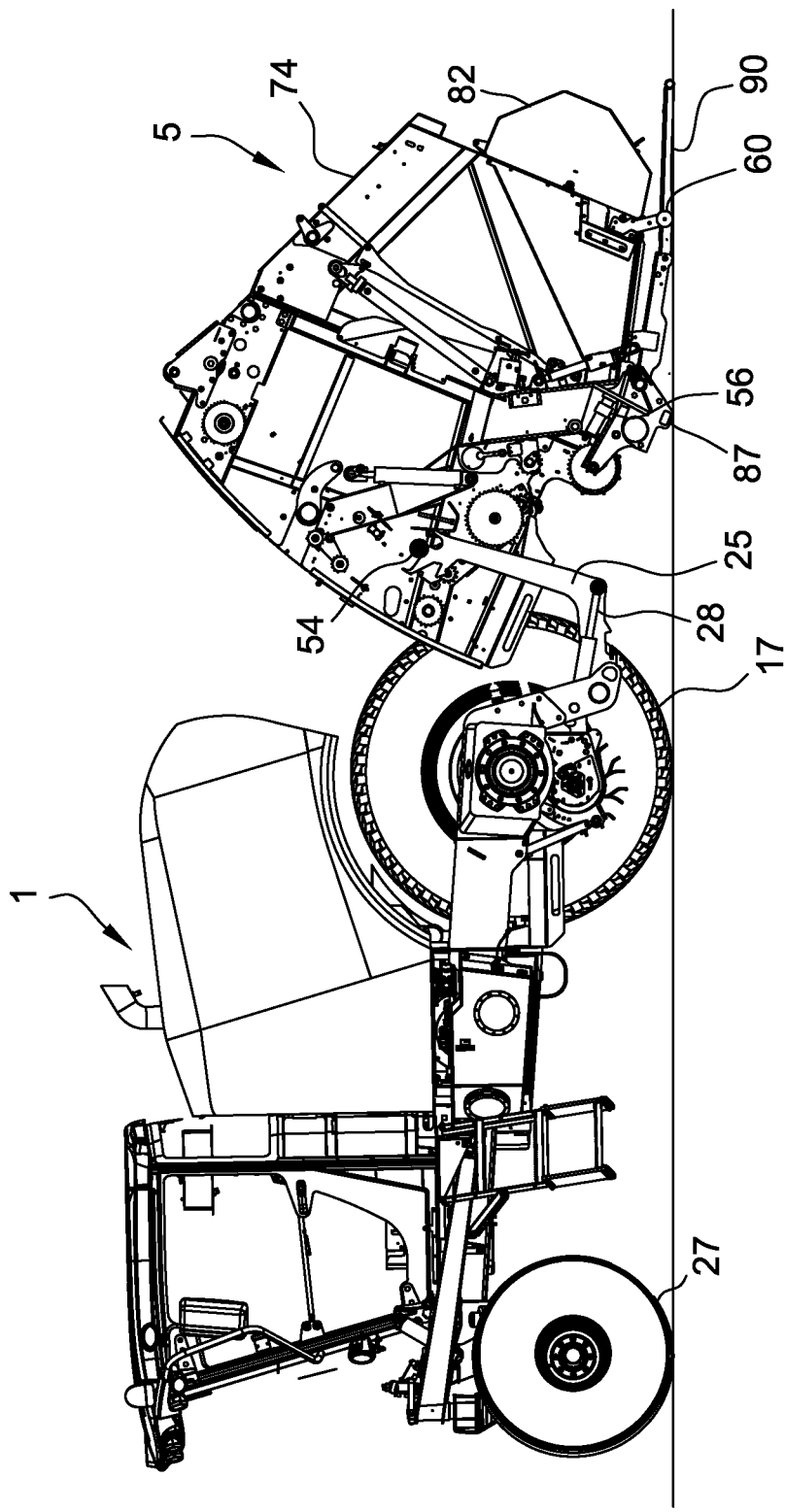
FIG. 6 is a side view of the vehicle with a baling device in an extended position.

In some embodiments, the vehicle 1 is releasably attached to a baling device 5 (FIG. 6). The baling device 5 may include an expandable baling chamber to form a bale. In the illustrated embodiment, the baling device 5 is configured to form cylindrical bales (i.e., round bales). The illustrated baling device 5 operates by utilizing a series of bale forming belts routed around a series of rollers. Alternatively, a single bale forming belt may be utilized.

Figure 8:
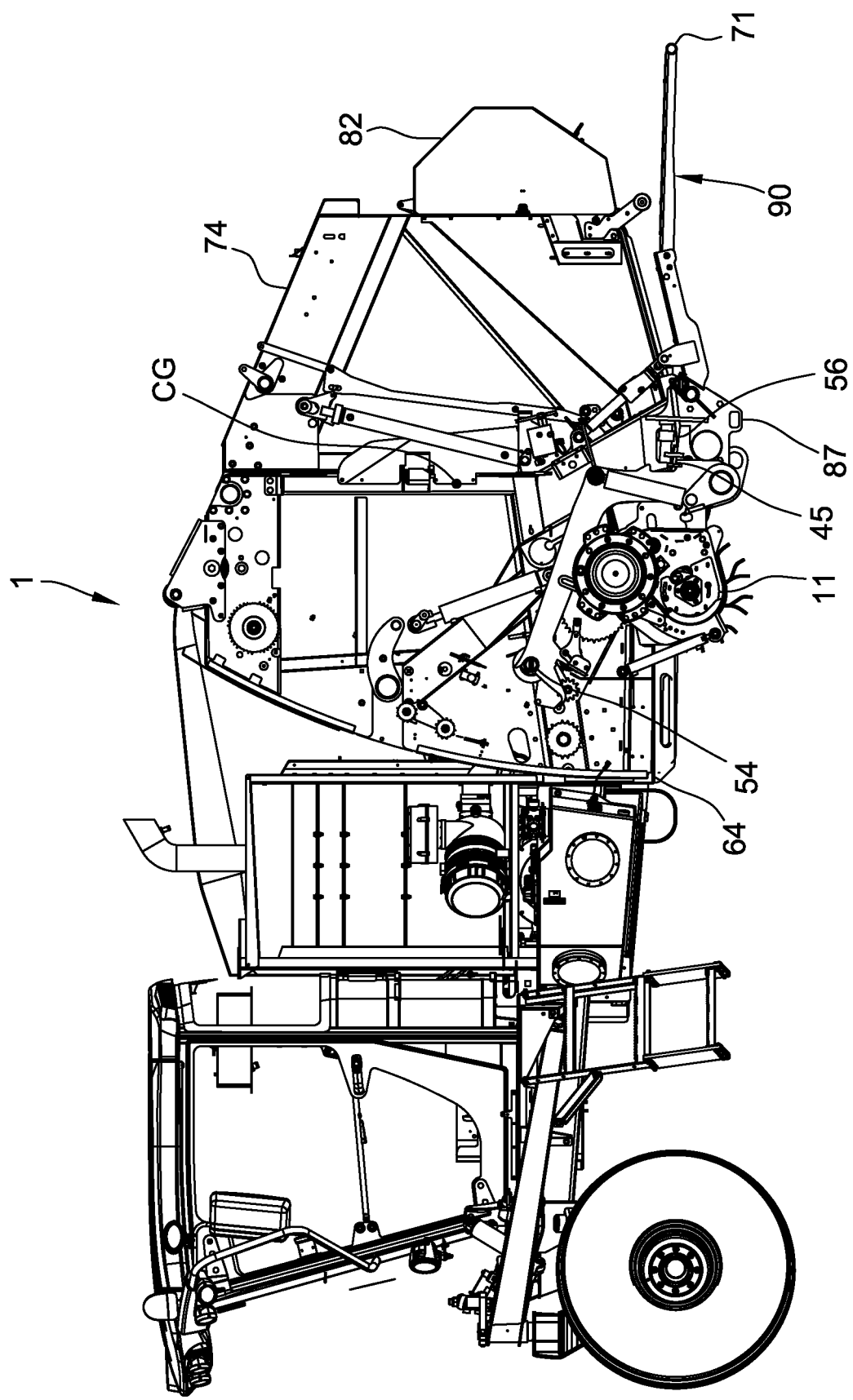
FIG. 8 is a side view of the vehicle with a baling device in a working position.

A pick-up device 11 (FIG. 8) is used to pick-up crop or forage material. The pick-up device 11 may be mounted on the base vehicle 1 or the baler device 5. As shown in FIG. 8, when the baler device 5 is moved to the mounted position, the baling device 5 is positioned to receive material from the pick-up device 11. As material is picked up by the pick-up device 11, and deposited in the baling chamber, the material is compressed by the plurality of bale forming belts. Rotation of the pick-up device is driven by a separate motor (e.g., hydraulic motor). It should be noted that any of the known round baler device arrangements may be used as baler device 5 including, variable chamber balers (as shown) and fixed chamber balers. The baler device may include a single drive motor or may include two or more drive motors.

Once a full bale (not shown) is formed, the vehicle is stopped and a wrapping sequence is commenced by a wrapping mechanism 82. The wrapping mechanism 82 is configured to apply one or more layers of wrap material to the outer circumference of the completed bale. The wrap material is spooled on a roll. Rope-like twine, sheet-type netwrap, plastic or fabric sheets, or film-type sheets are just some examples of commonly used wrap material.

Once the wrapping sequence is completed, the completed bale is ejected from the baling chamber by initiating opening of a tailgate 74. In the illustrated embodiments, the baling device 5 includes a discharge ramp 90 that forces the bale to roll away from the vehicle 1 to clear the tailgate 74 as the tailgate closes. The ramp 90 may be lowered as the tailgate 74 opens and raised before the tailgate closes to push the bale further away from the tailgate. In other embodiments, the baling device 5 does not include a discharge ramp.

Figure 4:
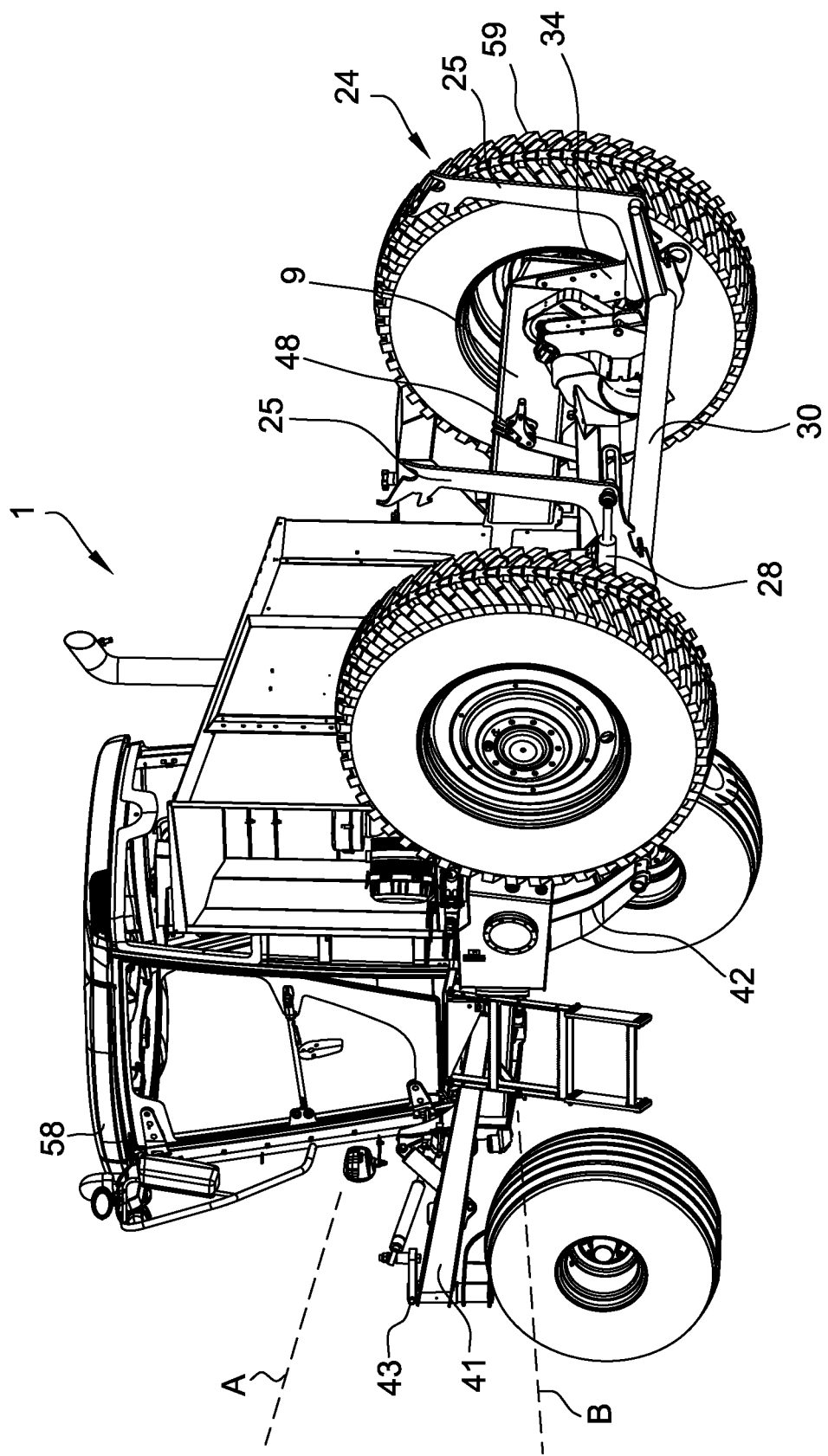
FIG. 4 is a perspective view of the vehicle.

Referring now to FIG. 4, the self-propelled vehicle 1 includes a device mount 24 having two mounting arms 25. A mount actuator 28, shown as a hydraulic cylinder, is connected to each arm 25 to pivot the arms to extend the device rearward from the vehicle 1. Each mounting arm 25 is attached to a cross-member 30 that is disposed between the two arms 25. The cross-member 30 defines a pivot axis $P_{24}$ (FIG. 5) about which the arms 25 rotate. The cross-member 30 pivots around a tube 33 within the cross-member 30. A bushing or bearing may be disposed between the cross-member 30 and tube 33 to promote rotation of the cross-member 30 about the tube 33. The tube 33 is connected to first and second brackets 34 that are connected to the chassis 9 (FIG. 4).

Operation of the actuators 28 causes the mounting arms 25 to pivot around pivot axis $P_{24}$ and causes the device 5 to move from a working or operating position (FIG. 8) in which the device 5 is positioned for operation to an extended position (FIG. 6). The extended position is disposed behind the working position relative to the longitudinal axis A (FIG. 4).

Figure 14:
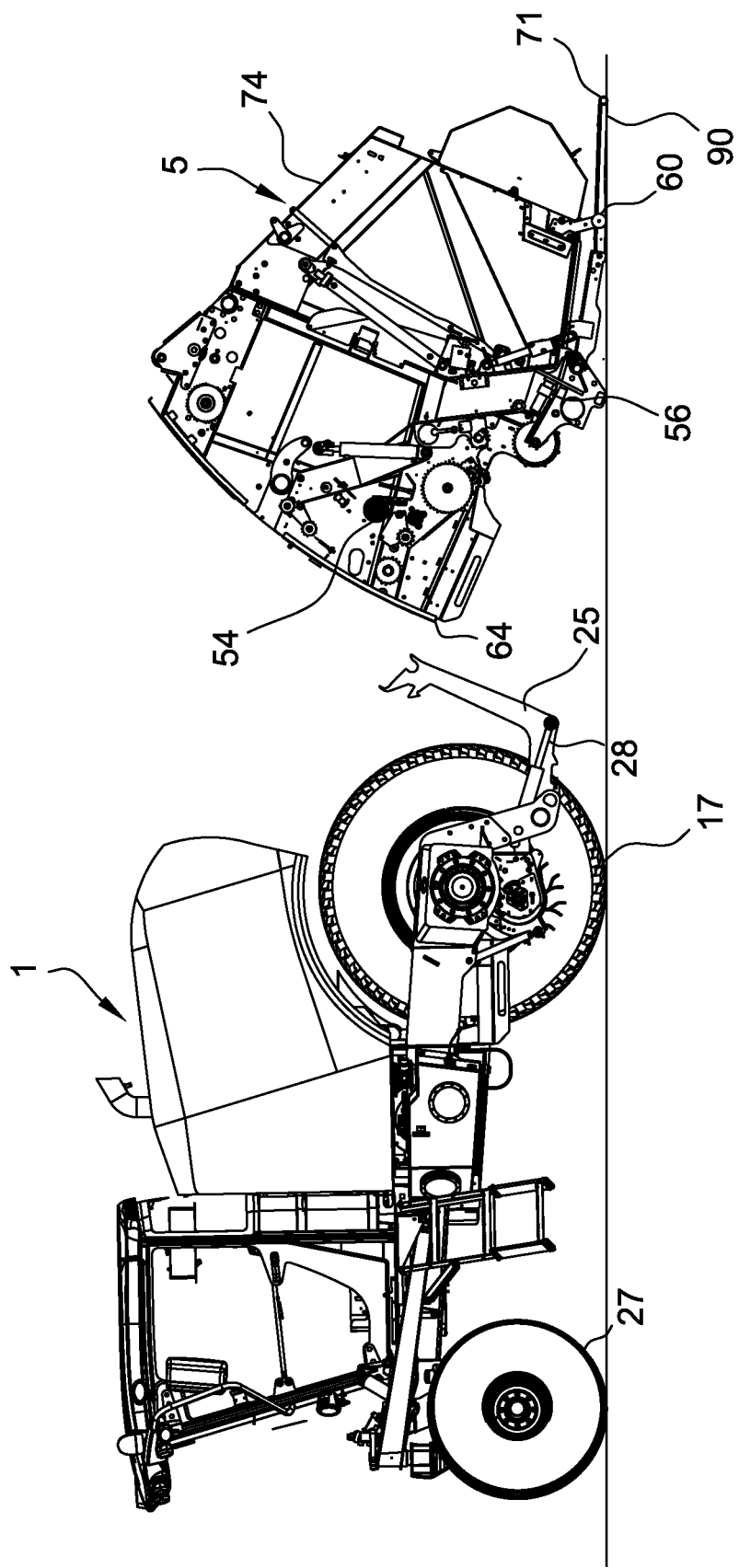
FIG. 14 is a side view of the vehicle separated from a baling device.
Figure 15:
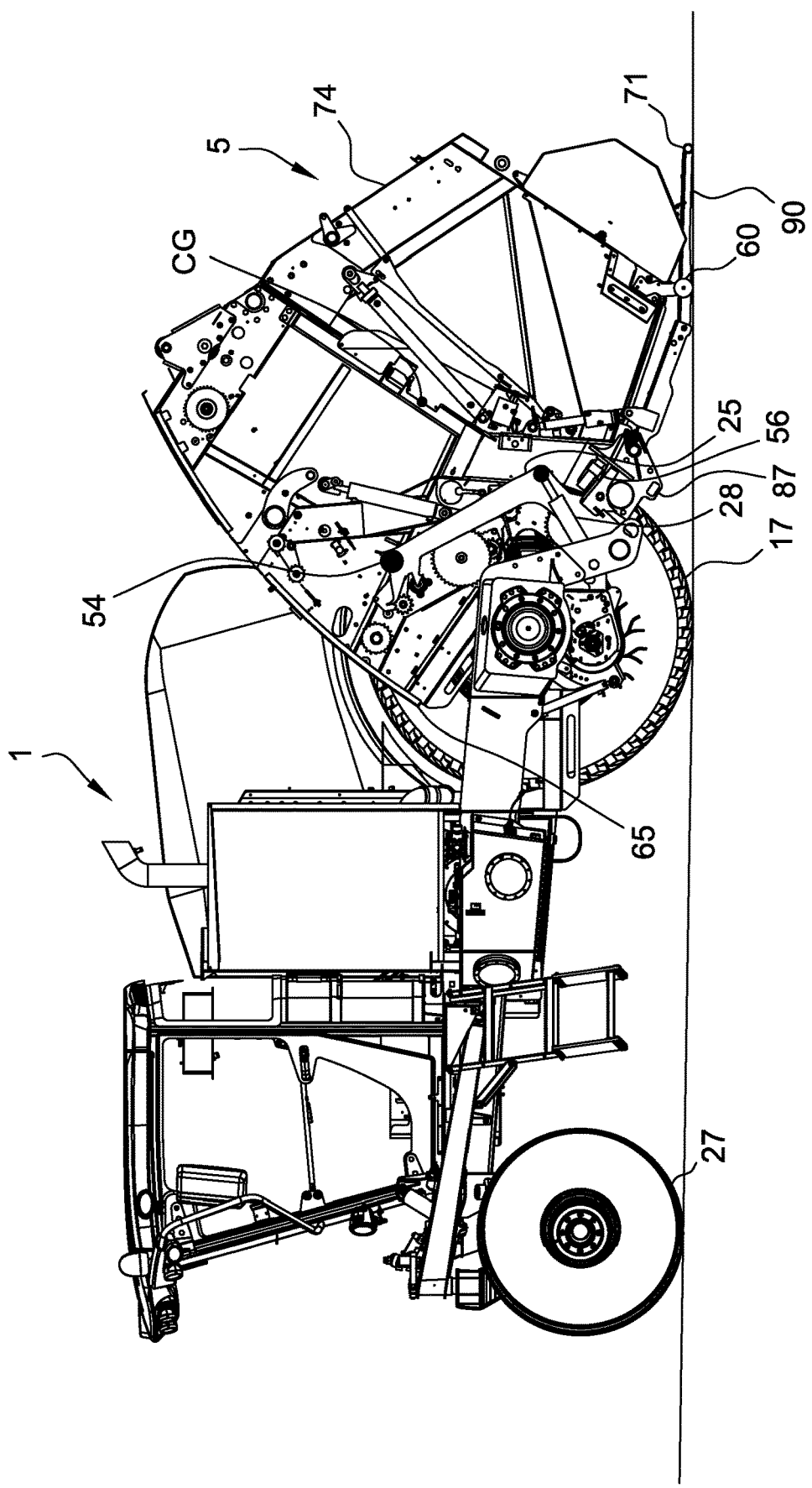
FIG. 15 is a side view of the vehicle with the device in a maintenance position.

The device 5 may also be moved to any position between the working position and extended position such as a maintenance position (FIG. 15). The device 5 may be accessed by a user in the maintenance position (FIG. 15) for routine maintenance work where the hydraulic and electrical connections are not affected, or the extended position (FIG. 6) where the hydraulic and electrical connections may need to be disconnected (e.g., for other maintenance requirements) or may be fully disconnected (FIG. 14) from the vehicle 1 to allow a second device to be mounted.

Generally, moving the device 5 from the working position (FIG. 8) to the maintenance position (FIG. 15) or to the extended position (FIG. 6) does not involve use of stands, legs, etc. that support the device (e.g., that support the device 5 as the vehicle 1 is driven away from the device 5). In the illustrated embodiment, the device mount 24 is mounted toward the rear 57 (FIG. 1) of the device to move the device 5 behind the base vehicle 1. In other embodiments, the device mount 24 is toward the front 55 of the base vehicle 1 to move the device 5 ahead of the vehicle 1 in the extended position. In such frontward-extending embodiments of the device mount, the device mount may generally operate as described herein for rearward-extending device mount. The vehicle 1 may include two device mounts 24 (e.g., one toward the front 55 and one toward the rear 57 of the base vehicle 1).

Each arm 25 includes an upper portion 50 (FIG. 5) and a lower portion 52. The upper portion 50 and lower portion 52 are angled with respect to each other (e.g., from about 30° to about 150°, from about 60° to about 120° or from about 90° to about 150°). In other embodiments, the arms 25 do not include angled upper and lower portions.

The upper portion 50 of each arm 25 includes a first mounting surface 32 (shown as a recess or notch) that contacts and/or secures the device when the device is coupled to the vehicle 1. In the illustrated embodiment, the mounting surface 32 forms a notch 36 to receive mounting members of the device (such as forward mounting members 54 on baler device 5 shown in FIG. 6). Generally, the mounting surfaces of the arms 25 are surfaces of the arms themselves rather than other components suspended or attached to the arms (e.g., chains, chain hooks, etc.), unless stated otherwise.

Figure 13:
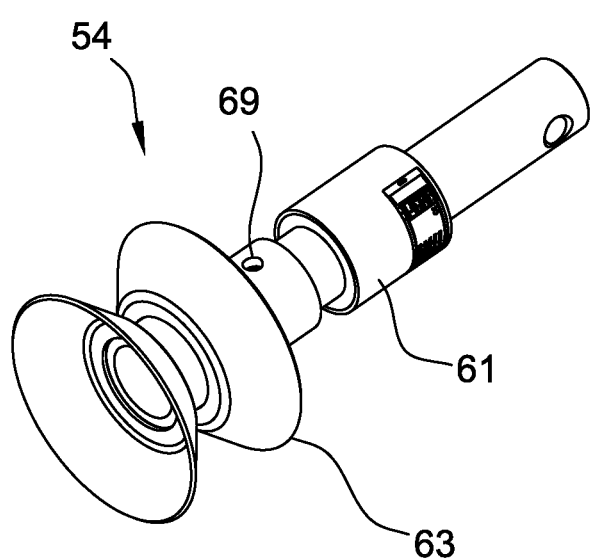
FIG. 13 is a perspective view of the forward device mounting member of the device.
Figure 19:
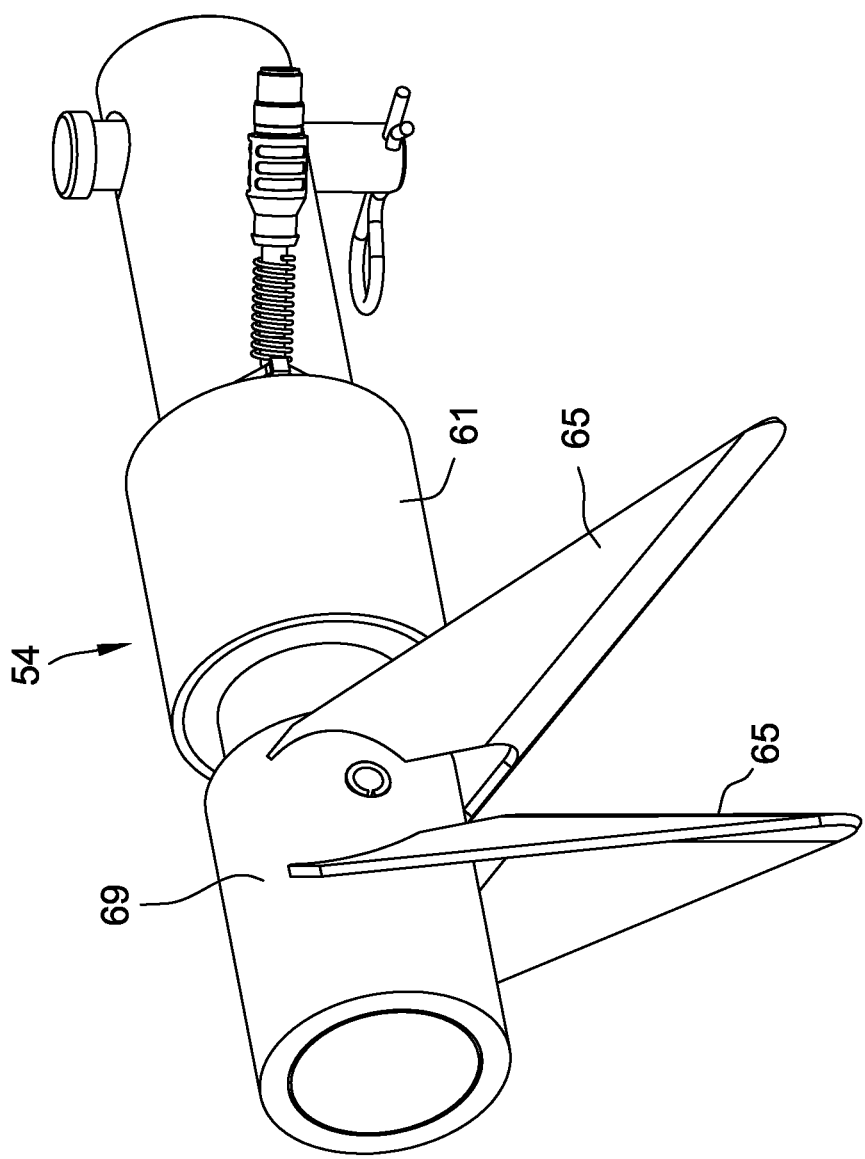
FIG. 19 is a perspective view of another embodiment of a forward mounting member of the device.

Referring to FIG. 13, the forward mounting members 54 of the device may include a load cell 61 and an arm 69 that extends from the load cell 61. A spindle 63 is connected to the arm 69. The mounting surface 32 of the device mount arm 25 (FIG. 5) engages and contact the spindle 63 when the device 5 is attached to the vehicle. Optionally, the spindle 63 may be mounted by a bearing or bushing to allow the spindle 63 to rotate relative to the load cell 61. In the embodiment illustrated in FIG. 19, the forward mounting member 54 includes a load cell 61, an arm 69 that extends form the load cell 61, and guide members 65 connected to the arm 69 to guide the mounting surface 32 of the arm 25 (FIG. 5) toward the forward mounting member 54 when mounting the device. In some embodiments, the guide members 65 are fixed (i.e., not rotatable) with respect to the arm 69 and load cell 61.

Each arm 25 also includes an outward extending upper finger 40. The upper fingers 40 and forward mounting members 54 may be configured to assist in aligning and properly positioning the arms 25 relative to the device 5. The upper finger 40 includes a guide surface 38 configured to contact the spindle 63 of the forward mounting member 54. The spindle 63 is configured with tapered sides to guide the upper finger 40 side-to-side into proper alignment with the forward mounting member 54. The upper finger 40 is configured to reposition the device 5 (e.g., by pushing the device 5 along the ground surface), to a point where the upper fingers 40 on both sides of the device are properly aligned with the forward mounting members 54 as the vehicle 1 is propelled in a reverse direction.

Once the upper fingers 40 on both sides of the device 5 are received in the spindles 63, the arms 25 may be rotated. As the arms 25 rotate, the spindles 63 of the forward mounting members 54 contact a lower finger 37 of the arm 25. The lower fingers 37 act as a stop to help ensure the spindles 63 engage the notches 36 of the arms 25. The lower fingers 37 extend radially from the pivot axis $P_{24}$ a distance greater than the radial distance of any portion of the notch 36 to ensure proper engagement as the arms 25 are rotated about the pivot axis $P_{24}$ by actuators 28.

Figure 10:
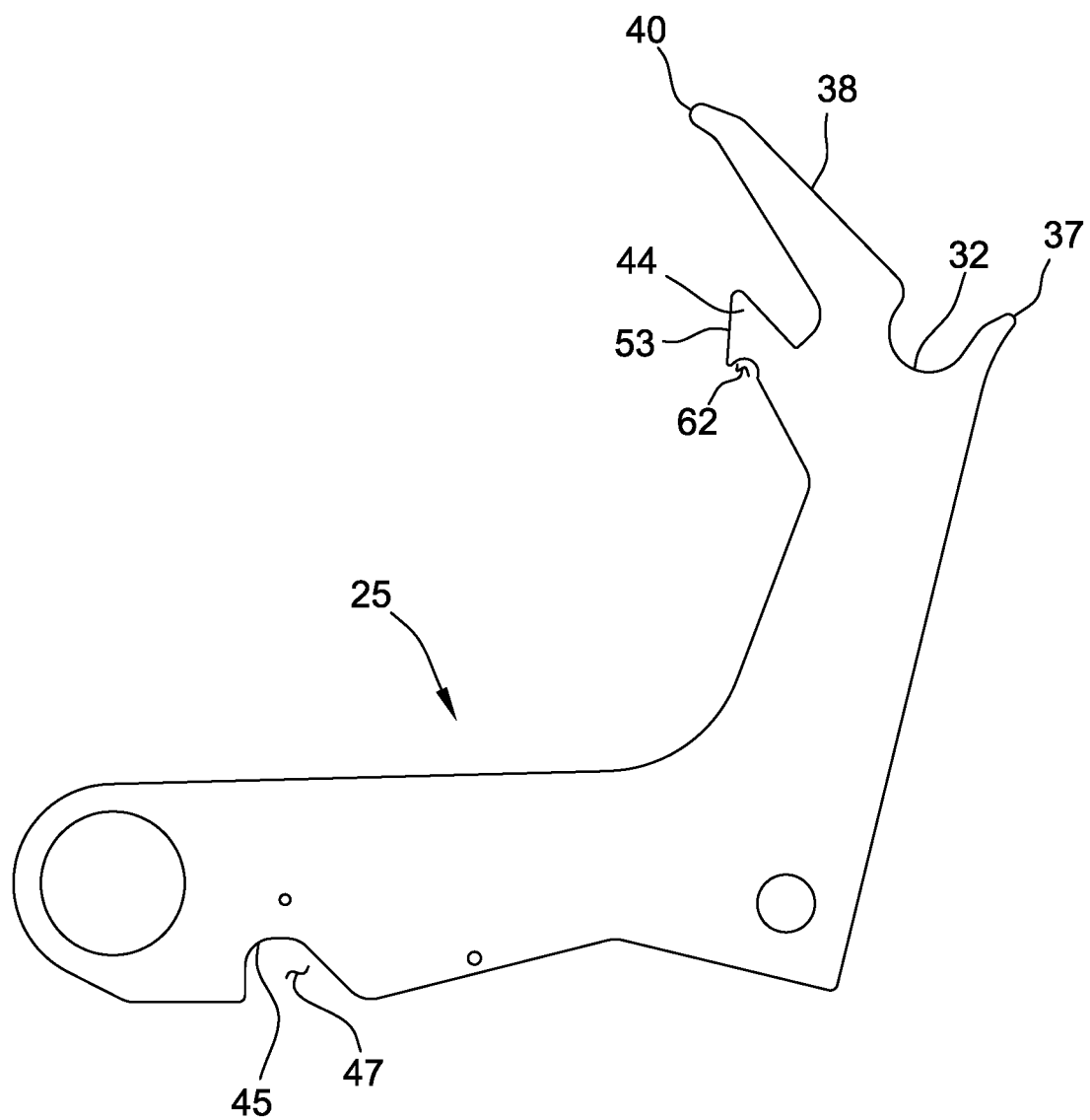
FIG. 10 is a side view of a mounting arm of the device mount.

Each arm 25 includes a second mounting surface 45 in the lower arm portion 52 to support the device 5. The second mounting surface 45 may be part of a brace 46 (FIG. 5) formed on the arm 25 or may define a notch 47 (FIG. 10) formed within the arm 25. During mounting of the device 5, after the device 5 is coupled to the upper portion 50 of the arms 25, the front portion of the device is carried by the arms 25, while the rear portion of the device is supported by the ground surface. In the illustrated embodiment, the device 5 includes rear ground supports 60, shown as rollers, that support the rear portion of the device 5 as it rests on the ground.

As the arms 25 are made to continue to pivot toward the front 55 of the vehicle to couple the device 5, a lower portion of the device 5 moves toward the lower portion 52 of the arm 25 as the device 5 is raised from the ground and carried by the arms 25. During this phase of the mounting process, the vehicle 1 may remain stationary with the device 5 sliding along the ground to move the lower portion of the device 5 to the arms 25. Alternatively, the movement of the arms 25 may be coordinated with the movement of the vehicle 1 without the device 5 being slid along the ground.

Figure 7:
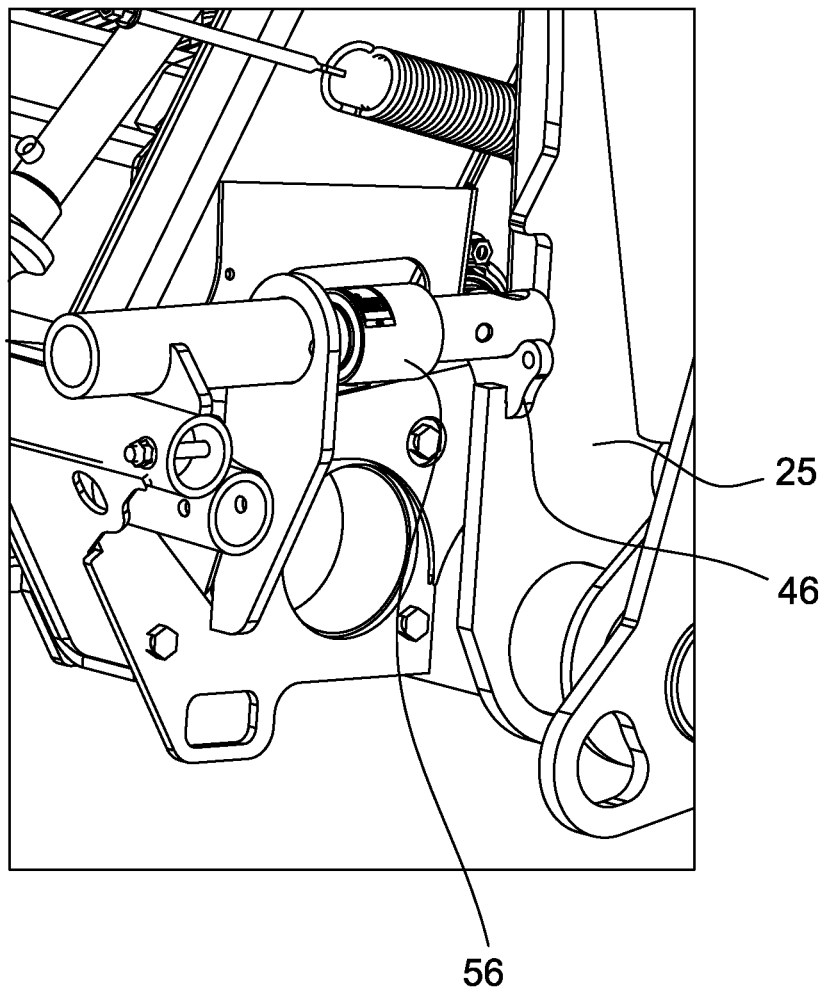
FIG. 7 is a detailed perspective view of a rear mounting member of the device received in the device mount.
Figure 12:
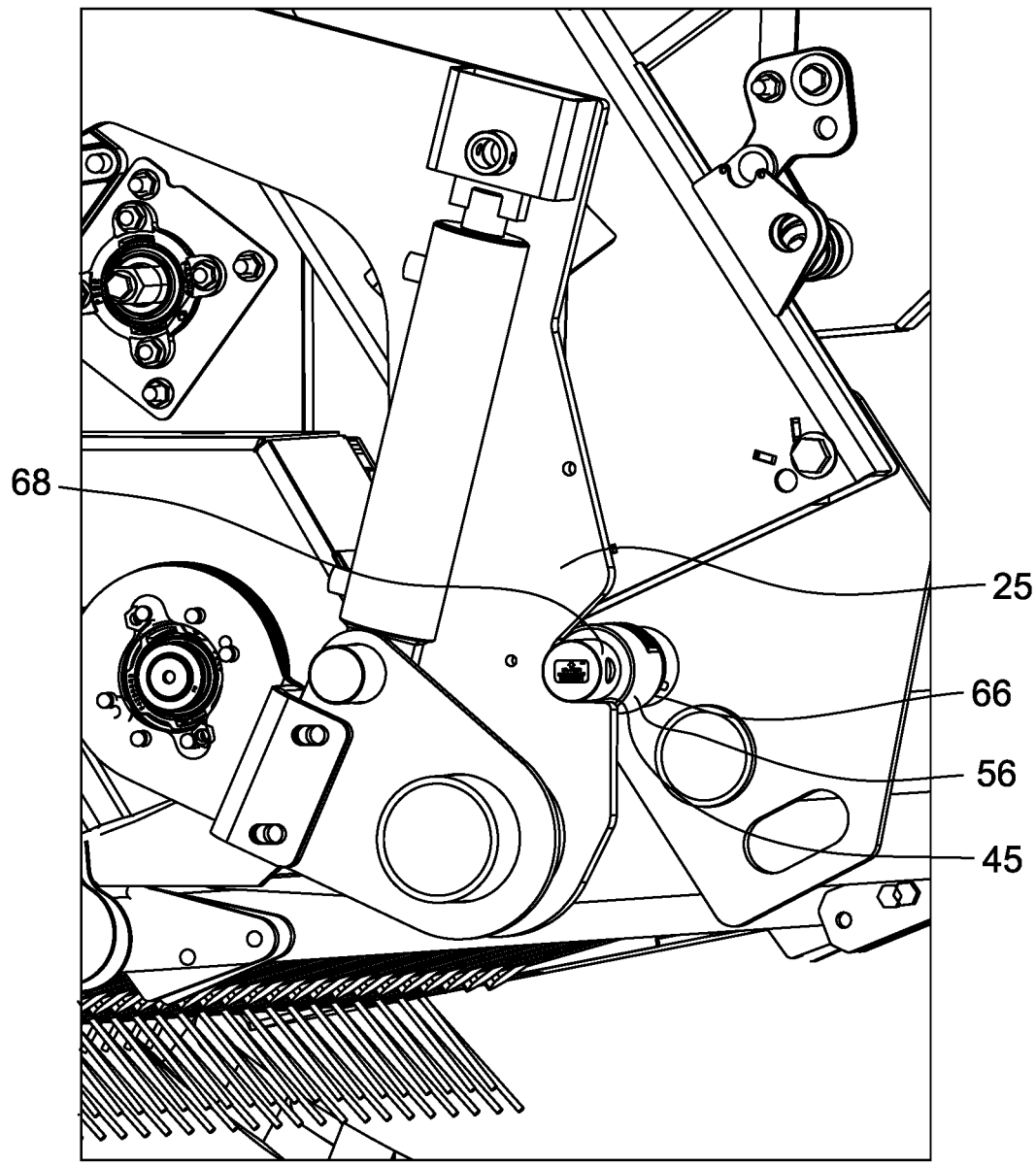
FIG. 12 is a detailed perspective view of another embodiment of the rear mounting member of the device received in the device mount.

The second mounting surface 45 receives a rear mounting member 56 (FIG. 12) of the device 5 as the device 5 moves toward the arm 25. The rear mounting member 56 may be a load cell and may be arranged longitudinally (FIG. 7) or laterally (FIG. 12). The rear mounting member 56 may include a load cell 66 and an arm 68 that extends from the load cell (FIG. 12). In some embodiments, the first and second mounting surfaces 32, 45 of each arm 25 are the only portions of the base vehicle 1 that contact and/or support the device 5 as the device 5 is moved from the working position to the extended position.

In the embodiment illustrated in FIGS. 16A-18B, the second mounting surface 45 forms a notch 47 in the arm 25. The device mount 24 includes an upper stop member 70 for limiting upward movement of the rear mounting member 56 when the device 5 and device mount 24 are in the working position (FIGS. 18A and 18B). In the illustrated embodiment, the upper stop member 70 includes a notch 76 with the rear mounting member 56 being partially received in the notch 76 when the device 5 and device mount 24 are in the working position. The stop member 70 is connected to the bracket 34 and does not move upon activation of the actuator 28. When mounting the device 5, after mounting the rear mounting member 56 into the notch 47 of the arm 24, the arm 25 continues to move toward the stop member 70. When the device mount 24 fully moves to the working position (FIGS. 18A and 18B), the rear mounting member 56 is at least partially received in the notch 47 of the arm 25 and the notch 76 of the upper stop member 70 to limit movement of the rear mounting member 56 relative to the device mount 24 (i.e., the arm 25 and stop member 70 together act as a latch to limit movement of the rear mounting member 56). The device mount 24 also includes a lateral stop member 84 for limiting lateral (i.e., side-to-side) movement of the rear mounting member 56 relative to the device mount 24. The lateral stop member 84 also includes a notch 86 (FIG. 16B) for receiving the rear mounting member 56.

In the illustrated embodiment, the device 5 includes two mounting members 54, 56 on each side of the device 5 (i.e., four mounting members). In other embodiments, the device 5 includes more or less than four mounting members (e.g., one central mounting member for connecting to a single central mounting arm or two mounting members with one mounting member on each side of the device). In some embodiments, the mounting members 54, 56 are the only portions of the device 5 that contact the base vehicle as the device 5 moves from the working position to the extended position.

Figure 5:
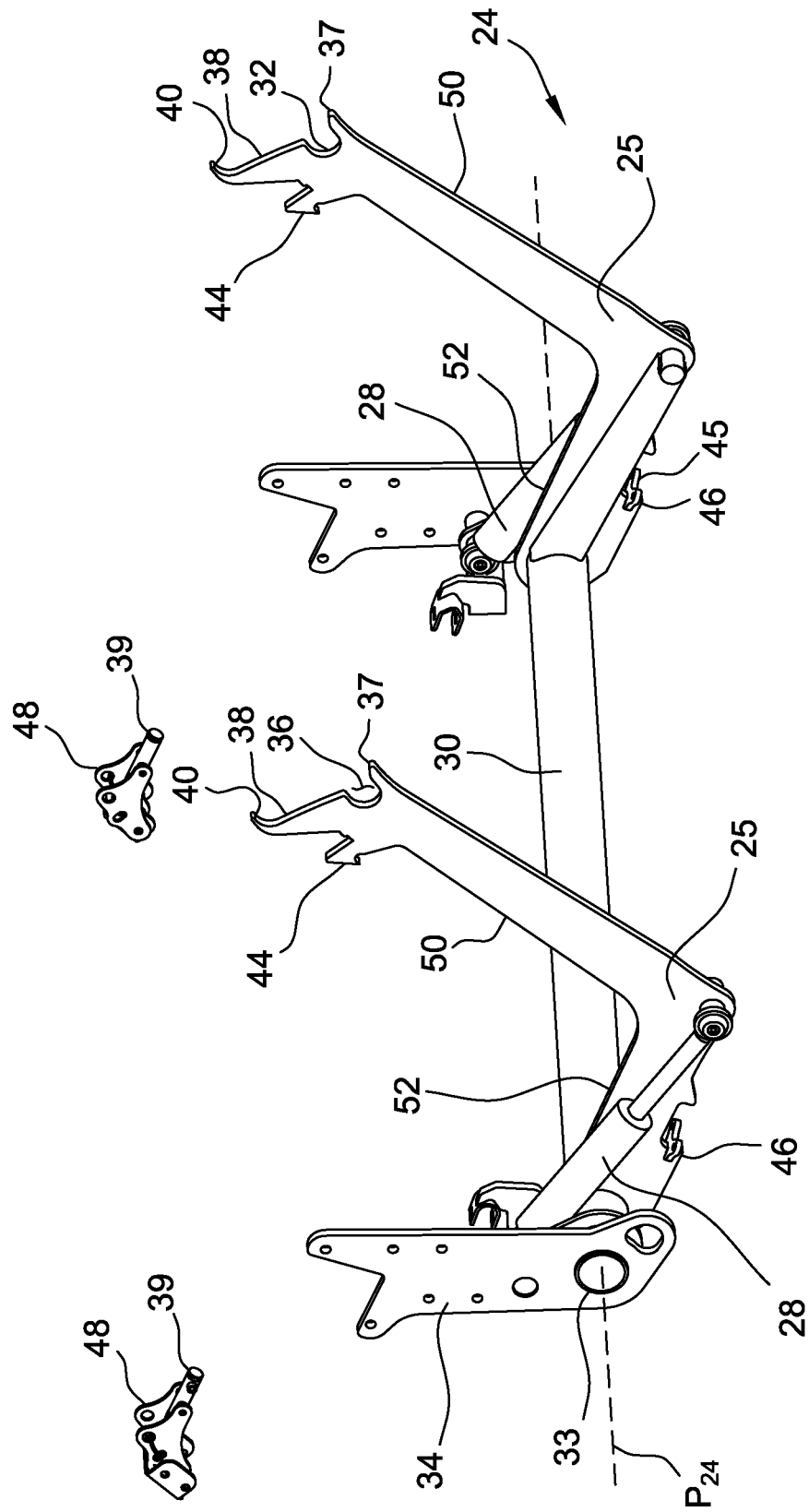
FIG. 5 is a perspective view of a device mount of the vehicle with the device mount in an extended position to connect a device.

The arms 25 include projections 44 that are configured to engage locking devices 48, shown as latches mounted on the self-propelled vehicle 1. The latches 48 include bars that are biased outward by a spring. As the arms 25 rotate toward the front 55 (FIG. 1) of the vehicle 1 such as during mounting of a device, a leading portion 53 (FIG. 10) of the projection 44 pushes against a bar of the latch 48. As the arm 25 continues to rotate, the bar is pushed back (against the bias of the spring) until the bar engages a projection recess 62 of the arm 25 to lock the arm 25 in the latch 48 (FIG. 5). The arms 25 may be released by activating a hydraulic cylinder 39 (FIG. 5) that moves the latch bar from the recess 62.

Figure 11:
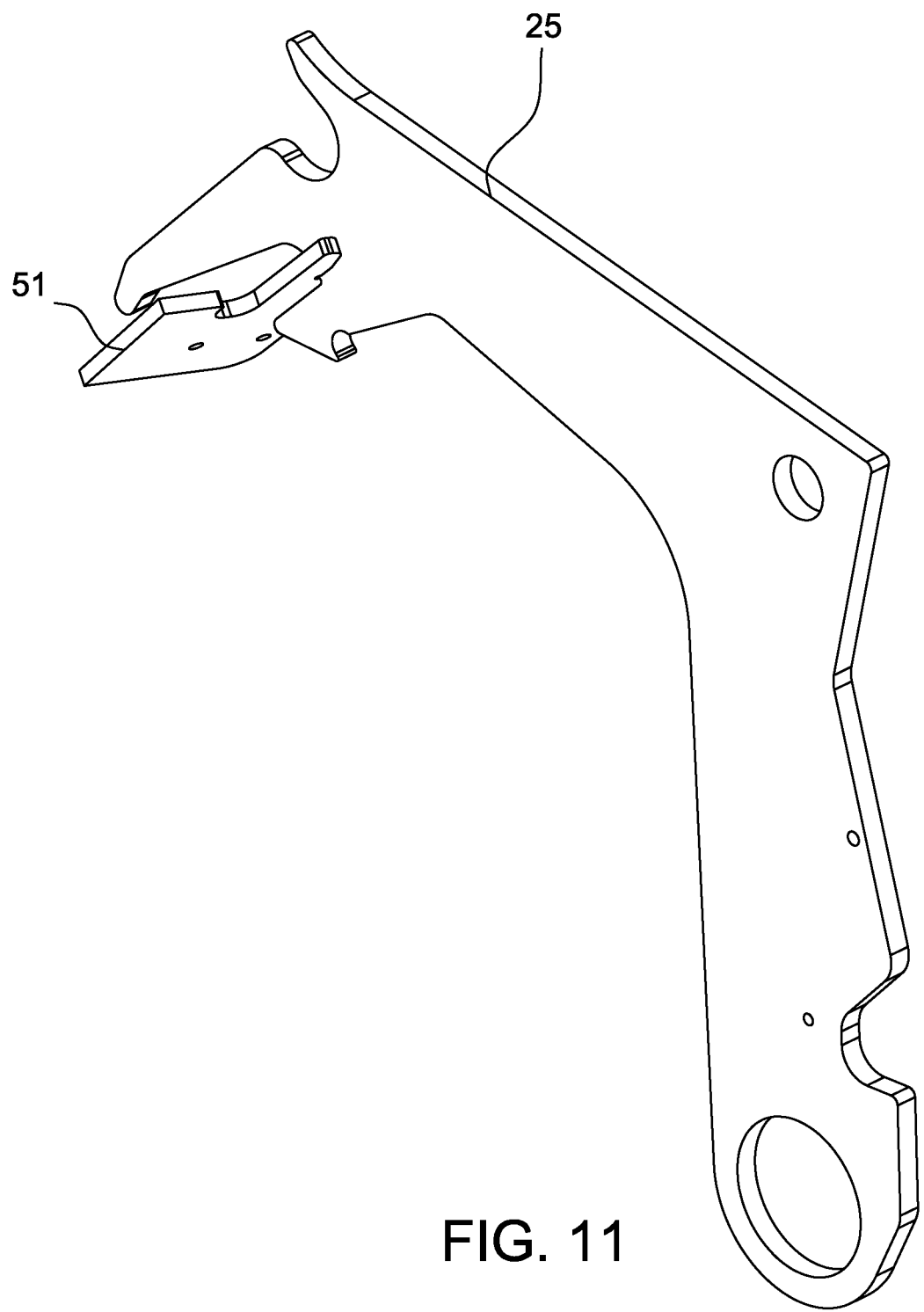
FIG. 11 is a perspective view of a mounting arm and arm stop.

In some embodiments and as shown in FIG. 11, in the working position of the device 5, each arm 25 rests on an arm stop 51 of the base vehicle 1 to support the device 5.

In the illustrated embodiment, the forward and rear mounting members 54, 56 of the device are load cells. The load cells allow the weight of a load carried by the self-propelled vehicle to be measured and/or monitored. For example, in embodiments in which the device is a baler, the load cells allow the weight of the bale during the baling operation to be monitored. In embodiments in which the device is a sprayer or broadcast sprayer, the load cells allow the amount of applied agricultural material (e.g., herbicide, pesticide, fertilizer, etc.) to be monitored.

Figure 9:
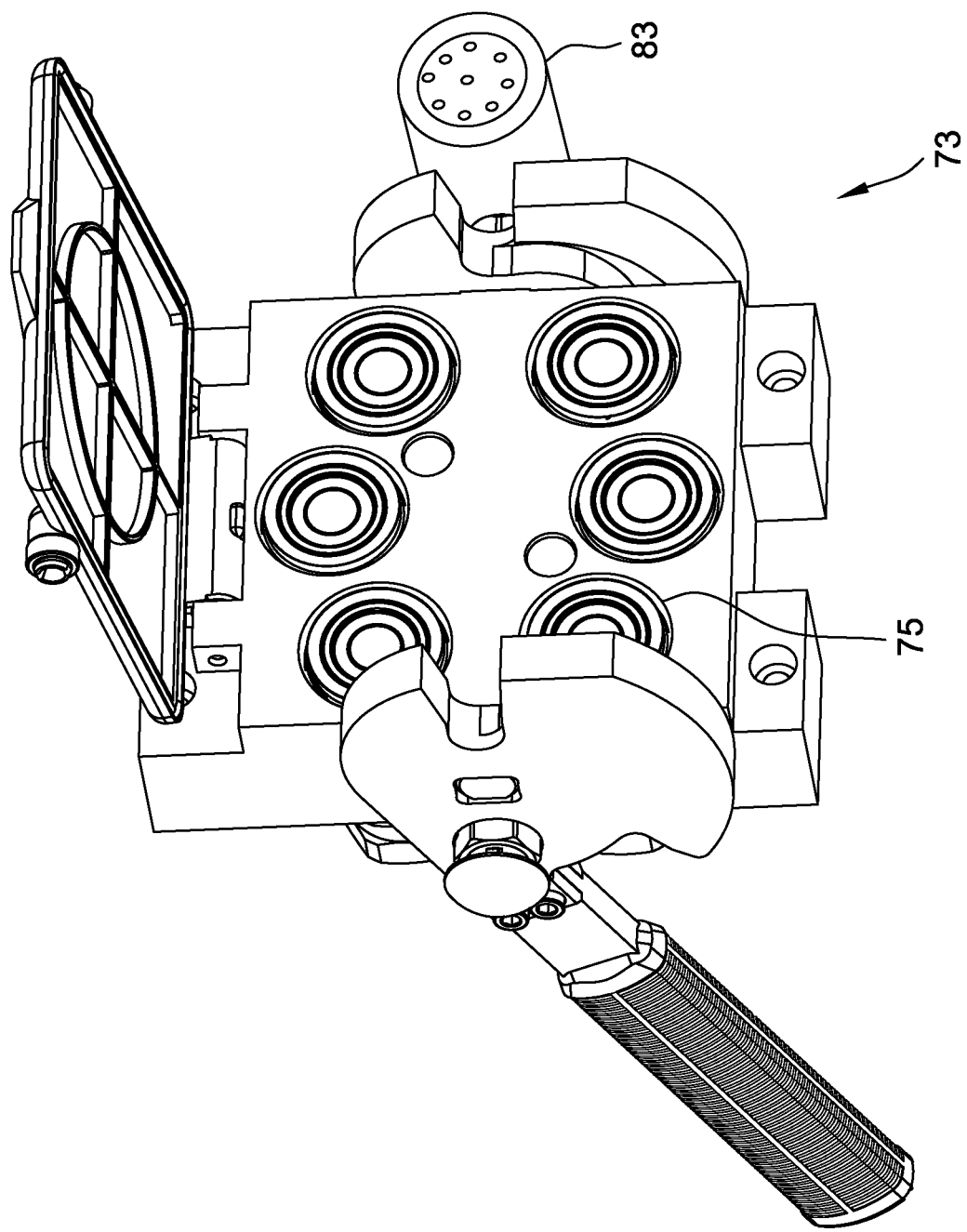
FIG. 9 is a perspective view of a vehicle-device interface having power and communication adapters.

Referring now to FIG. 9, each of the base vehicle and device may include a vehicle-device interface 73 with the two interfaces being coupleable to each other. The vehicle-device interfaces 73 allow the vehicle to power and/or control the device after being coupled. Each interface 73 may include power adapters 75 and/or communication adapters 83. The power adapters 75 and/or communication adapters 83 may be combined in a single unit (e.g., quick connect adapters) or in separate components each connectable separate from the other adapters (e.g., multiple hydraulic connections). The power adapters 75 are configured to transmit the type of power that powers the device (e.g., hydraulic, pneumatic, and/or electrical sources).

The interface 73 may include communication adapters 83 for control of the device. For example, the vehicle and device may each include ISO-BUS adapters to allow the device to be controlled by a user from the base vehicle. In some embodiments, the base vehicle 1 includes a visual display and/or interface (e.g., ISO-BUS terminal) that communicates with a controller, such as a controller mounted on the vehicle or device.

In the illustrated embodiment, the device 5 includes one or more rollers 60 (FIG. 15) that contact the supporting surface while moving the device 5 toward the self-propelled vehicle 1. For example, the device may include first and second rollers 60 that are laterally outward to the ramp 90 to allow the ramp 90 to pivot or fold up toward the tailgate 74 in the extended position of the device 5. The rollers 60 promote movement of the device 5 toward the vehicle 1 or away from the vehicle 1 when the device is extended or retracted back to the working position. In other embodiments, the device includes skids or wheels that contact the supporting surface while moving the device. When resting on the ground, the baler may be supported by the roller(s) 60, discharge ramp 90 and/or baler frame (e.g., tie-down 87 of the frame).

To couple the self-propelled vehicle 1 to a device such as a baler device 5, the arms 25 of the vehicle 1 are moved to an extended position and the vehicle is reversed toward the device. As the vehicle 1 is reversed, one of the finger 40 (FIG. 5), the mounting surface 32 of the notch 36 or a surface of the arm 25 between the finger 40 and notch 36 contact the forward mounting member 54 of the device 5. Once contact is made, the actuator 28 may be operated (e.g., retracted) to align the mounting member 54 with the notch 36. Once the mounting member 54 is received in the notch 36, the actuator 28 is operated to pull the device 5 onto the vehicle 1.

As the actuator 28 further retracts, the rear mounting member 56 (FIGS. 7 and 12) of the device 5 contacts the second mounting surface 45 on the arm 25. The arm 25 continues to rotate until the arm projection 44 (FIG. 5) engages the latch 48.

After the device 5 is fully coupled to the self-propelled vehicle 1, the various power systems (e.g., hydraulics) and communication systems may be connected through the vehicle-device interfaces 73 (FIG. 9).

To disconnect the device 5 from the vehicle 1, the power and communication systems may be disconnected. The power and communication systems may be disconnected before or after the device 5 is moved. The power and communication systems may include an emergency breakaway that allows the device to be dismounted without the power and communications systems being manually disconnected.

The hydraulic cylinder 39 is operated to allow the latch 48 to disengage the projections 44 of the arms 25. The actuators 28 are extended to rotate the mounting arms 25 away from the vehicle 1. In some embodiments, the hydraulic cylinders 39 are hydraulically connected with the actuators 28 such that, upon commencement of the dismounting operation, activation of the actuators 28 causes the latches 48 to be disengaged.

Referring now to FIG. 6, as the device is set on the supporting surface and the arms 25 extended, the forward mounting members 54 exit the notch 36 (FIG. 5) and rest on guide surfaces 38. The vehicle 1 may then be driven forward away from the device 5.

In some embodiments, the device 5 and/or vehicle 1 are configured such that, as the device 5 is rotated back from the working position (FIG. 8), the device 5 is securely supported by the mounting arms 25 to prevent "free-fall" of the device. In the working position of the device 5 (FIG. 8), the center of gravity CG of the device is between the second mounting surface 45 of the device mount and the front 64 of the device 5 relative to the longitudinal axis A (FIG. 4). This allows the device 5 to rest forward on the arms 25 and or arm stop 51 (FIG. 11). As the device 5 is moves from the working position of FIG. 8 to an extended position (FIGS. 14-15), the device 5 is rotates such that the center of gravity CG (FIG. 15) of the device moves to a position between a device tie-down 87 and the roller 60. By moving the center of gravity toward the rear 71 of the device 5 as the device 5 moves between the working position to the extended position, the front 64 of the device 5 may be tipped upward in the extended and/or detached position.

It should be noted that while a single device is shown and described as being attached to the base vehicle, two or more devices may be mounted at any one time unless stated otherwise (e.g., (1) baler device and wheel rake or (2) mower conditioner and merger or any other suitable combination).

Compared to conventional vehicles, the self-propelled vehicles of embodiments of the present disclosure have several advantages. The mounting arms allow the device may be moved behind the drive wheels allowing for the device to be more accessible for maintenance. The vehicle is modular and may mount to a variety of devices such as agricultural devices. In embodiments in which the arms include an upper finger, the vehicle may more easily be connected to the device. In embodiments in which the device includes a roller, skid or wheel, the device may more easily move to and away from the vehicle during coupling and decoupling of the device.

By incorporating front caster wheel assemblies and hydraulic rear drive wheels that rotate independently, the vehicle is highly maneuverable and is able to turn within its own footprint (i.e., in a counter-steer arrangement or zero-turn radius). This allows the vehicle to be turned quickly such as for reversing direction upon the vehicle reaching the end of row in the field or, when a bale device is mounted, for repositioning prior to bale discharge to prevent bales from rolling down an incline during bale discharge.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A self-propelled vehicle capable of supporting and operating a baler, the vehicle having a longitudinal axis and comprising:
    a chassis;
    a front wheel connected to the chassis;
    a rear wheel connected to the chassis; and
    a device mount capable of releasably attaching the baler, the device mount comprising:
        a mounting arm having a first mounting surface and a second mounting surface capable of connecting to the baler, the mounting arm being pivotally mounted to the chassis to move the baler along the longitudinal axis between:
            a working position wherein the baler is mounted to the mounting arm at the first and second mounting surfaces;
            an extended position wherein the baler is coupled to the mounting arm at only the first mounting surface, the extended position being disposed behind the working position relative to the longitudinal axis; and
            an intermediate position between the working position and the extended position wherein the baler is mounted to the mounting arm at the first and second mounting surfaces.

2. The self-propelled vehicle as set forth in claim 1 in combination with the baler, the baler having a mounting member removably connected to the mounting arm of the device mount.

3. The self-propelled vehicle as set forth in claim 2 wherein the baler comprises a load cell, the load cell being the mounting member.

4. The self-propelled vehicle as set forth in claim 2, the baler having a front and a rear, wherein, as the baler moves between the working position to the extended position, the center of gravity of the baler shifts toward the rear of the baler relative to the longitudinal axis to allow the front of the baler to be tipped upward when in the extended position.

5. The self-propelled vehicle as set forth in claim 1 wherein the mounting arm is a first mounting arm, the device mount comprising a second mounting arm, the second mounting arm being pivotal to move the baler between the working position, intermediate position and extended position.

6. The self-propelled vehicle as set forth in claim 1 wherein the first and second mounting surfaces each define a notch in the mounting arm for receiving the baler.

7. The self-propelled vehicle as set forth in claim 1 wherein the mounting arm is a first mounting arm, the device mount comprising a second mounting arm, the second mounting arm being pivotal to move the baler between the working position, intermediate position, and extended position, the second mounting arm also having first and second mounting surfaces for connecting to the baler, the first and second mounting surfaces of the first and second mounting arms being the only surfaces that support the baler when moving the baler between the working position, intermediate position, and extended position.

8. The self-propelled vehicle as set forth in claim 1 wherein the front wheel is a first front wheel and the rear wheel is a first rear wheel, the vehicle further comprising a second front wheel connected to the chassis and a second rear wheel connected to the chassis, the front wheels being caster wheels and the rear wheels being drive wheels.

9. The self-propelled vehicle as set forth in claim 1 further comprising a vehicle-device interface for powering and/or controlling the baler, the interface being releasably couple-able to the baler, and wherein the vehicle-device interface is configured to allow the vehicle to communicate with the baler to control the baler when the vehicle is coupled to the baler.

10. The self-propelled vehicle as set forth in claim 9 wherein the vehicle-device interface comprises a power adapter and/or communications adapter, the adapter being releasably coupleable to the baler.

* * * * *